(12) United States Patent  
Norris et al.

(10) Patent No.: US 9,098,080 B2  
(45) Date of Patent: Aug. 4, 2015

(54) SYSTEMS AND METHODS FOR SWITCHING BETWEEN AUTONOMOUS AND MANUAL OPERATION OF A VEHICLE

(75) Inventors: William Robert Norris, Rock Hill, SC (US); James Allard, Newton, MA (US); Mikhail O. Filippov, Arlington, MA (US); Robert Dale Haun, York, SC (US); Christopher David Glenn Turner, Waterloo, IA (US); Seth Gilbertson, Paso Robles, CA (US); Andrew Julian Norby, West Des Moines, IA (US)

(73) Assignees: Deere & Company, Moline, IL (US); iRobot Corporation, Bedford, MA (US)

( * ) Notice: Subject to any disclaimer, the term of this patent is extended or adjusted under 35 U.S.C. 154(b) by 0 days.

(21) Appl. No.: 12/959,429

(22) Filed: Dec. 3, 2010

(65) Prior Publication Data  
US 2011/0071718 A1 Mar. 24, 2011

Related U.S. Application Data

(62) Division of application No. 11/584,087, filed on Oct. 20, 2006, now Pat. No. 7,894,951.

(60) Provisional application No. 60/729,445, filed on Oct. 21, 2005, provisional application No. 60/729,388, filed on Oct. 21, 2005, provisional application No. 60/780,389, filed on Mar. 8, 2006, provisional application No. 60/838,704, filed on Aug. 18, 2006.

(51) Int. Cl.  
*G05D 1/02* (2006.01)  
*G05B 19/414* (2006.01)  
(Continued)

(52) U.S. Cl.  
CPC .............. *G05B 19/414* (2013.01); *B60T 7/22* (2013.01); *B62D 1/286* (2013.01); *G05D 1/0061* (2013.01);  
(Continued)

(58) Field of Classification Search  
CPC ..... G05D 1/0055; G05D 1/0061; G05D 1/021; G05D 1/0246; G05D 2201/02; G05D 2201/0213  
USPC .............. 701/2, 23, 41, 43, 70; 180/400, 404, 180/443, 446  
See application file for complete search history.

(56) References Cited

U.S. PATENT DOCUMENTS 4,155,417 A 5/1979 Ziems  
4,202,037 A 5/1980 Glaser et al.  
(Continued)

FOREIGN PATENT DOCUMENTS

DE 3404202 5/1987  
EP 1184254 3/2002  
(Continued)

OTHER PUBLICATIONS

Yokokohji, et al., "Operation Modes for Cooperating with Autonomous Functions in Intellignet Teleoperation Systems," 1992, IEEE International Workshop on Robot and Human Communication.*  
(Continued)

*Primary Examiner* — Spencer Patton  
(74) *Attorney, Agent, or Firm* — Kilpatrick Townsend & Stockton LLP

(57) ABSTRACT

Systems and methods for switching between autonomous and manual operation of a vehicle are described. A mechanical control system can receive manual inputs from a mechanical operation member to operate the vehicle in manual mode. An actuator can receive autonomous control signals generated by a controller. When the actuator is engaged, it operates the vehicle in an autonomous mode, and when disengaged, the vehicle is operated in manual mode. Operating the vehicle in an autonomous mode can include automatically controlling steering, braking, throttle, and transmission. A system may also allow the vehicle to be operated via remote command.

23 Claims, 22 Drawing Sheets

(51) Int. Cl.
*B60T 7/22* (2006.01)
*B62D 1/28* (2006.01)
*G05D 1/00* (2006.01)
*B60W 30/09* (2012.01)
*B60W 30/095* (2012.01)

(52) U.S. Cl.
CPC .............. *G05D 1/021* (2013.01); *G05D 1/024* (2013.01); *G05D 1/0246* (2013.01); *G05D 1/0274* (2013.01); *G05D 1/0278* (2013.01); *B60W 30/09* (2013.01); *B60W 30/095* (2013.01); *G05D 1/027* (2013.01); *G05D 1/028* (2013.01); *G05D 1/0251* (2013.01); *G05D 1/0259* (2013.01); *G05D 1/0272* (2013.01); *G05D 2201/0201* (2013.01); *G05D 2201/0202* (2013.01); *G05D 2201/0209* (2013.01); *G05D 2201/0213* (2013.01); *G05D 2201/0216* (2013.01); *Y10S 901/01* (2013.01); *Y10S 901/47* (2013.01)

(56) References Cited

U.S. PATENT DOCUMENTS

| | | |
|---|---|---|
| 4,297,734 A | 10/1981 | Laishley et al. |
| 4,361,202 A | 11/1982 | Minovitch |
| 4,579,209 A | 4/1986 | Pacht |
| 4,791,544 A | 12/1988 | Gauterin et al. |
| 4,945,647 A | 8/1990 | Beneventano et al. |
| 4,985,845 A | 1/1991 | Gotz et al. |
| 4,987,402 A | 1/1991 | Nykerk |
| 5,170,352 A | 12/1992 | McTamaney et al. |
| 5,220,497 A | 6/1993 | Trovato et al. |
| 5,227,973 A | 7/1993 | Marcantonio |
| 5,245,422 A | 9/1993 | Borcherts et al. |
| 5,400,864 A | 3/1995 | Winner et al. |
| 5,455,409 A | 10/1995 | Smith et al. |
| 5,471,560 A | 11/1995 | Allard et al. |
| 5,508,689 A | 4/1996 | Rado et al. |
| 5,511,147 A | 4/1996 | Abdel-Malek |
| 5,555,503 A | 9/1996 | Kyrtsos et al. |
| 5,563,478 A | 10/1996 | Suganuma |
| 5,600,561 A | 2/1997 | Okamura |
| 5,602,735 A | 2/1997 | Wada |
| 5,652,849 A | 7/1997 | Conway et al. |
| 5,675,229 A | 10/1997 | Thorne |
| 5,684,696 A * | 11/1997 | Rao et al. ............. 701/25 |
| 5,715,902 A | 2/1998 | Petrovich et al. |
| 5,794,164 A | 8/1998 | Beckert et al. |
| 5,831,826 A | 11/1998 | Van Ryswyk |
| 5,920,172 A | 7/1999 | Bauer |
| 5,984,880 A | 11/1999 | Lander et al. |
| 5,995,883 A | 11/1999 | Nishikado |
| 6,008,985 A | 12/1999 | Lake et al. |
| 6,038,496 A | 3/2000 | Dobler et al. |
| 6,053,270 A * | 4/2000 | Nishikawa et al. ......... 180/168 |
| 6,055,042 A | 4/2000 | Sarangapani |
| 6,058,427 A | 5/2000 | Viswanath et al. |
| 6,088,020 A | 7/2000 | Mor |
| 6,108,031 A | 8/2000 | King et al. |
| 6,113,395 A | 9/2000 | Hon |
| 6,169,940 B1 | 1/2001 | Jitsukata et al. |
| 6,198,992 B1 | 3/2001 | Winslow |
| 6,233,504 B1 | 5/2001 | Das et al. |
| 6,236,916 B1 | 5/2001 | Staub et al. |
| 6,243,759 B1 | 6/2001 | Boden et al. |
| 6,253,161 B1 | 6/2001 | Arias-Estrada |
| 6,259,980 B1 | 7/2001 | Peck et al. |
| 6,321,147 B1 | 11/2001 | Takeda et al. |
| 6,356,819 B1 | 3/2002 | Winslow |
| 6,400,996 B1 | 6/2002 | Hoffberg et al. |
| 6,434,462 B1 | 8/2002 | Belvy et al. |
| 6,445,983 B1 | 9/2002 | Dickson et al. |
| 6,480,762 B1 | 11/2002 | Uchikubo et al. |
| 6,535,793 B2 | 3/2003 | Allard |
| 6,592,412 B1 | 7/2003 | Geil et al. |
| 6,600,986 B2 | 7/2003 | Steinle et al. |
| 6,633,800 B1 * | 10/2003 | Ward et al. ............. 701/2 |
| 6,650,625 B1 | 11/2003 | Norizuki et al. |
| 6,694,260 B1 | 2/2004 | Rekow |
| 6,760,654 B2 | 7/2004 | Beck |
| 6,789,014 B1 | 9/2004 | Rekow et al. |
| 6,813,557 B2 | 11/2004 | Schmidt et al. |
| 6,845,297 B2 | 1/2005 | Allard |
| 6,873,911 B2 | 3/2005 | Nishira et al. |
| 6,901,319 B1 | 5/2005 | Nelson et al. |
| 6,927,699 B2 | 8/2005 | Samukawa et al. |
| 6,950,882 B1 | 9/2005 | Weber et al. |
| 6,975,246 B1 | 12/2005 | Trudeau |
| 7,024,278 B2 | 4/2006 | Chiappetta et al. |
| 7,123,522 B2 | 10/2006 | Ho et al. |
| 7,188,000 B2 | 3/2007 | Chiappetta et al. |
| 7,299,057 B2 | 11/2007 | Anderson |
| 8,020,657 B2 | 9/2011 | Allard et al. |
| 2001/0018640 A1 | 8/2001 | Matsunaga |
| 2001/0056544 A1 | 12/2001 | Walker |
| 2002/0022909 A1 | 2/2002 | Karem |
| 2002/0035416 A1 | 3/2002 | De Leon |
| 2002/0104300 A1 | 8/2002 | Hunt |
| 2002/0110155 A1 | 8/2002 | Pearce et al. |
| 2002/0136939 A1 | 9/2002 | Grieve et al. |
| 2002/0169531 A1 | 11/2002 | Kawazoe et al. |
| 2003/0016682 A1 | 1/2003 | Cho |
| 2003/0023348 A1 | 1/2003 | Inoue et al. |
| 2003/0032335 A1 | 2/2003 | Garnett et al. |
| 2003/0038842 A1 | 2/2003 | Peck et al. |
| 2003/0080772 A1 | 5/2003 | Giacomini et al. |
| 2004/0052047 A1 | 3/2004 | Bresniker |
| 2004/0061596 A1 | 4/2004 | Egami |
| 2004/0114584 A1 | 6/2004 | Patz |
| 2004/0158379 A1 | 8/2004 | Horbaschek |
| 2004/0168837 A1 | 9/2004 | Michaud et al. |
| 2004/0193363 A1 | 9/2004 | Schmidt et al. |
| 2004/0217881 A1 | 11/2004 | Pedyash et al. |
| 2004/0239490 A1 | 12/2004 | Chiba et al. |
| 2004/0243285 A1 | 12/2004 | Gounder |
| 2005/0002419 A1 | 1/2005 | Doviak et al. |
| 2005/0021195 A1 | 1/2005 | Zeitler et al. |
| 2005/0021860 A1 | 1/2005 | Kelly et al. |
| 2005/0092542 A1 | 5/2005 | Turner |
| 2005/0159870 A1 | 7/2005 | Tohdo et al. |
| 2005/0216181 A1 | 9/2005 | Estkowski et al. |
| 2005/0264998 A1 | 12/2005 | McCutcheon et al. |
| 2006/0014439 A1 | 1/2006 | Mundry et al. |
| 2006/0022625 A1 | 2/2006 | Hampo et al. |
| 2006/0073761 A1 | 4/2006 | Weiss et al. |
| 2006/0075176 A1 | 4/2006 | Okamoto |
| 2006/0095207 A1 | 5/2006 | Reid |
| 2006/0106496 A1 | 5/2006 | Okamoto |
| 2006/0178828 A1 | 8/2006 | Moravec |
| 2006/0214253 A1 | 9/2006 | Camagna et al. |
| 2006/0237968 A1 | 10/2006 | Chandraskearan |
| 2006/0267777 A1 | 11/2006 | Moore |
| 2007/0193798 A1 | 8/2007 | Allard et al. |
| 2007/0198144 A1 | 8/2007 | Norris et al. |
| 2007/0219666 A1 | 9/2007 | Filippov et al. |
| 2009/0024357 A1 | 1/2009 | Aso et al. |
| 2009/0125175 A1 | 5/2009 | Park et al. |
| 2011/0208357 A1 | 8/2011 | Yamauchi |
| 2012/0046820 A1 | 2/2012 | Allard et al. |

FOREIGN PATENT DOCUMENTS

| | | |
|---|---|---|
| EP | 1481945 | 12/2004 |
| GB | 2128842 A | 8/1983 |
| JP | 11149315 A | 6/1999 |
| WO | WO 99/05580 | 2/1999 |
| WO | WO 01/26338 | 4/2001 |
| WO | WO 2004/086084 | 10/2004 |
| WO | WO 2007/048003 | 4/2007 |

(56) References Cited

FOREIGN PATENT DOCUMENTS

| WO | WO 2007/048029 | 4/2007 |
|---|---|---|
| WO | WO 2007/050406 | 5/2007 |

OTHER PUBLICATIONS

Response to Final Office Action for U.S. Appl. No. 11/584,097, filed May 5, 2011 (8 pages).
Notice of Allowance for U.S. Appl. No. 11/584,097, mailed May 19, 2011 (7 pages).
Department of Energy, Technology Application, "Tactical Robotic Vehicle Aids in Battlefield Surveillance," NTIS Tech Notes, Springfield, VA, Dec. 1990.
Corbett, G.K., et al., "A Human Factors Tested for Ground-Vehicle Telerobotics Research," Southeastcon '90 Proceedings, vol. 2, pp. 618-620, 1990.
Yokokohji, et al., "Operation Modes for Cooperating with Autonomous Functions in Intelligent Teleoperation Systems," 1992, IEEE International Workshop on Robot and Human Communication.
Shimoga, et al., "Touch and Force Reflection for Telepresence Surgery," IEEE, pp. 1049-1050, 1994.
Green, P.S., et al., "Telepresence Surgery," IEEE, Engeneering in Medicine and.Biology, pp. 324-329, May/Jun. 1995.
Mair, "Telepresence-The Technology and Its Economic an Social Implications," IEEE, pp. 118-124, 1997.
Spofford, John R., et al., "Description of the UGV/Demo II System," Proceedings: Association for Unmanned Vehicle Systems International Conference, 1997, pp. 255-264 (12 pages).
Naki, et al., "7 DOF Arm Type Haptic Interface for Teleoperation and Virtual Reality Systems," Proceedings of the 1998 IEEE/RSJ INTL. Conference on Intelligent Robots and Systems, pp. 1266-1271, 1998.
Ohashi, et al., "The Sensor Arm and the Sensor Glove II—Haptic Devices for VR Interface," IEEE, p. 785, 1999.
Tech Firm Showing Off Gadgets for Consumers, The Wall Street Journal, 2001.
Astronomical Data Analysis Software & Systems XIV, Pasadena, CA, Oct. 24-27, 2004 (194 pages).
Beard, A, et al., "The Use of CANbus in CARMA," Astronomical Data Analysis Software & Systems XIV, Pasadena, CA, Oct. 24-27, 2004, p. 153 (1 page).
Patent Abstracts of Japan, JP 2000094373 A, Apr. 4, 2000, Takahashi Katsunori.
Introducing the iRobot-LE, iRobot Corpation, http://www.irobot.com/ir/index.htm Retrieval Date Dec. 5, 2000.
Rankin, Arturo L., et al. "Passive perception system for day/night autonomous off-road navigation," Proceedings of the SPIE Defense and Security Symposium: Unmanned Ground Vehicle Technology VI Conference, Mar. 2005 (16 pages).
International Search Report and Written Opinion for PCT/US2006/040800 dated Mar. 1, 2007 ((eight pages), ).
International Search Report and Written Opinion for PCT/US2006/040801, dated Mar. 1, 2007.
International Search Report and Written Opinion for PCT/US2006/041177, dated Jun. 11, 2007 (16 pages).
International Search Report and Written Opinion for PCT/US2006/041227, dated Jun. 11, 2007 (15 pages).
International Preliminary Report on Patentability for PCT/US2006/040801, dated Apr. 23, 2008 (8 pages).
International Preliminary Report on Patentability for PCT/US006/041177, dated Apr. 23, 2008 (12 pages).
International Preliminary Report on Patentability for PCT/US2006/041227, dated Apr. 23, 2008 (11 pages).
International Preliminary Report on Patentability for PCT/US2006/040800, dated Apr. 23, 2008 (9 pages).
Restriction Requirement—Non-Final Office for U.S. Appl. No. 11/584,087, mailed Aug. 31, 2009 (16 Pages).
Non-Final Office Action for U.S. Appl. No. 11/584,097, mailed Sep. 1, 2009 (6 Pages).
Response to Restriction Requirement for U.S. Appl. No. 11/584,085, mailed Sep. 30, 2009 (10 Pages).
Response to Restriction Requirement for U.S. Appl. No. 11/584,087, mailed Oct. 22, 2009 (3 Pages).
Non-Final Office for U.S. Appl. No. 11/584,085, mailed Dec. 16, 2009 (10 Pages).
Non-Final Office Action for U.S. Appl. No. 11/584,097, mailed Dec. 23, 2009 (5 Pages).
Non-Final Office Action for U.S. Appl. No. 11/584,084, mailed Jan. 13, 2010 (6 Pages).
Non-Final Office for U.S. Appl. No. 11/584,087, mailed Feb. 19, 2010 (3 Pages).
Wikipedia, "Internet Protocol Suite," "http://en.wikipedia.org/wiki/Internet_Protocol_Suite, (accessed Apr. 13, 2010) (5 pages).
Amendment and Response to Non-Final Office Action for U.S. Appl. No. 11/584,085, filed Apr. 15, 2010 (15 pages).
Non-Final Office Action for U.S. Appl. No. 11/584,084, mailed May 7, 2010 (39 Pages).
Final Office Action for U.S. Appl. No. 11/584,085, mailed May 10, 2010 (11 Pages).
Non-Final Office Action for U.S. Appl. No. 11/584,097, mailed May 26, 2010 (6 pages).
Amendment and Response to Non-Final Office Action for U.S. Appl. No. 11/584,087, filed Jun. 21, 2010 (33 Pages).
Final Office Action for U.S. Appl. No. 11/584,085, mailed Aug. 25, 2010 (14 pages).
Notice of Allowance for U.S. Appl. No. 11/584,087, mailed Sep. 2, 2010, (6 pages).
Amendment and Response to Non-Final Office Action for U.S. Appl. No. 11/584,084, filed Oct. 5, 2010 (58 pages).
Amendment and Response to Non-Final Office Action for U.S. Appl. No. 11/584,085, filed Oct. 25, 2010 (16 pages).
Amendment and Response to Non-Final Office Action for U.S. Appl. No. 11/584,097, filed Oct. 25, 2010 (13 pages).
Advisory Action for U.S. Appl. No. 11/584,085 mailed Nov. 4, 2010 (3 pages).
Amendment and Response to Final Office Action for U.S. Appl. No. 11/584,085, filed Nov. 26, 2010 (16 pages).
Final Office Action for U.S. Appl. No. 11/584,084, mailed Jan. 4, 2011 (34 Pages).
Final Office Action for U.S. Appl. No. 11/584,097, mailed Jan. 5, 2011 (5 Pages).
Response Under 37 CFR § 1.116 for U.S. Appl. No. 11/584,084, mailed Feb. 23, 2011 (43 pages).
Non-Final Office Action for U.S. Appl. No. 11/584,084, mailed Mar. 22, 2011 (51 pages).
U.S. Appl. No. 11/584,084, Amendment and Response to Non-Final Office Action filed Jul. 22, 2011 (54 pages).
U.S. Appl. No. 11/584,084, Non-Final Office Action mailed Oct. 20, 2011 (31 pages).
U.S. Appl. No. 11/584,084, Amendment and Response to Non-Final Office Action filed Feb. 21, 2012 (42 pages).
U.S. Appl. No. 11/584,085, Non-Final Office Action mailed May 10, 2012 (21 pages).
U.S. Appl. No. 11/584,084, Non-Final Office Action mailed Jul. 13, 2012 (27 pages).
U.S. Appl. No. 11/584,085, Response to Non-Final Office Action filed Feb. 5, 2013 (12 pages).
U.S. Appl. No. 11/584,085, Notice of Allowance mailed Feb. 25, 2013 (8 pages).
Australian Patent Application No. AU 2011213807, Examination Report No. 1 mailed May 10, 2013 (7 pages).
U.S. Appl. No. 11/584,085, Response to Non-Final Office Action filed Aug. 9, 2012 (16 pages).
U.S. Appl. No. 11/584,085, Non-Final Office Action mailed Oct. 12, 2012 (16 pages).
U.S. Appl. No. 11/584,084, Response to Non-Final Office Action filed Nov. 13, 2012 (38 pages).
U.S. Appl. No. 13/212,696, Non-Final Office Action, mailed Oct. 11, 2013, 25 pages.
Weingarten, Jan, et al., EFK-based 3D SLAM for Structured Environment Reconstruction, IEEE, Aug. 2005, 6 pages.
Gharapetian et al., "An Object-Oriented Data Fusion System for Mobile Vehicle", IEEE, 1995, pp. 1404-1409.

(56) References Cited

OTHER PUBLICATIONS

Fiorini et al., "Motion Planning in Dynamic Environments Using Velocity Obstacles", Int. J. Robotics Res., 1998, pp. 1-27.
Prassler et al., "Tracking Multiple Moving Objects for Real-Time Robot Navigation", Autonomous Robots, 2000, 15 pages.
Prassler et al., "A Robotic Wheelchair for Crowded Public Environments", IEEE, Mar. 2001, pp. 38-45.
Krishna et al., "When Does A Robot Perceive A Dynamic Object?", Journal of Robotic Systems, vol. 19, No. 2, 2002, pp. 73-90.
Bedkowski et al., "3D Laser Range Finder Simulation Based on Rotated LMS SICK 200", Proceedings of the EURON/IARP International Workshop on Robotics for Risky Interventions and Surveillance of the Environment, Jan. 2008, 7 pages.
U.S. Appl. No. 13/212,696, Non-Final Office Action, mailed Jun. 21, 2013, 27 pages.
U.S. Appl. No. 11/584,084, Final Office Action mailed Jan. 6, 2014, 40 pages.
U.S. Appl. No. 13/902,026, Non-Final Office Action mailed Dec. 9, 2013, 9 pages.
U.S. Appl. No. 13/212,696, Notice of Allowance mailed Aug. 15, 2014, 10 pages.
U.S. Appl. No. 13/902,026, Final Office Action mailed Apr. 11, 2014, 10 pages.
U.S. Appl. No. 13/212,696, Final Office Action mailed Apr. 23, 2014, 31 pages.
U.S. Appl. No. 11/584,084, Non-Final Office Action mailed Jun. 20, 2014, 38 pages.
U.S. Appl. No. US 13/902,026, Non-Final Office Action mailed Jan. 23, 2015, 11 pages.
Lin, Charles, "Big and Little Endian", Mar. 10, 2003, University of Maryland, http://wwvv.cs.umd.edu/class/sum2003/cmsc311/Notes/Data/endian.html, 6 pages.
U.S. Appl. No. 13/902,026, Final Office Action mailed Apr. 29, 2015, 17 pages.

* cited by examiner

SYSTEMS AND METHODS FOR SWITCHING BETWEEN AUTONOMOUS AND MANUAL OPERATION OF A VEHICLE

CROSS REFERENCE TO RELATED APPLICATIONS

This application is a divisional of U.S. patent application Ser. No. 11/584,087 filed Oct. 20, 2006, which claims priority to U.S. Provisional Patent Application No. 60/729,445, filed Oct. 21, 2005, U.S. Provisional Patent Application No. 60/729,388, filed Oct. 21, 2005, U.S. Provisional Patent Application No. 60/780,389, filed Mar. 8, 2006, and U.S. Provisional Patent Application No. 60/838,704, filed Aug. 18, 2006, each of which is incorporated herein by reference in its entirety.

This application is related to U.S. patent applications entitled "Versatile Robotic Control Module" U.S. Ser. No. 11/584,084; "Systems and Methods for Obstacle Avoidance" U.S. Ser. No. 11/584,097; and "Networked Multi-Role Robotic Vehicle" U.S. Ser. No. 11/584,085, each of which was filed on Oct. 20, 2006 and is incorporated herein by reference in its entirety.

FIELD OF THE INVENTION

This invention relates generally to systems and methods for vehicle operation. More particularly, embodiments of this invention relate to systems and methods for switching between autonomous and manual operations of a vehicle.

BACKGROUND OF THE INVENTION

In October 2005, five autonomous vehicles successfully completed the "Grand Challenge" of the United States Defense Department's Advanced Research Projects Administration (DARPA), a competition requiring fully robotic vehicles to traverse a course covering more than one hundred miles. These vehicles were outfitted with robotic control systems in which a bank of computers control all of the operational systems of the vehicle, such as the steering, braking, transmission, and throttle, subject to autonomous decisions made by programs on board the vehicle, without human intervention on the course itself.

While the designers and builders of these vehicles have made an impressive accomplishment, the vehicles themselves were converted into special-purpose robots. There is no requirement in the competition for the vehicles to also be drivable by an operator, so only a few were. Even those that were drivable were not necessarily drivable in an ordinary manner. For example, a steering wheel on such a vehicle might still be turned by a human, but would encounter unnatural and sometimes dangerous resistance from a still-attached robotic actuator. While it is known that some of the vehicles were driven to the site on each day of competition, none are known to have been equally capable as autonomous vehicles and as manually driven vehicles. None were safe both in an autonomous role and in a manual role—the course was cleared of all spectators, and passengers were not allowed during autonomous operation. None had much, if any, provision for considering how an operator may safely and naturally interact with the vehicle.

With respect to switching between autonomous and manual use, robotic conversion of a vehicle can result in a conversion from conventional cabled and hydraulic control (direct mechanical control) to indirect control systems referred to as drive-by-wire systems. In drive-by-wire systems an actuator, such as an electric motor or hydraulic cylinder, applies throttle, braking, and/or steering input. These drive-by-wire systems do not have a connection to an operable mechanical control for ordinary driving (such as a lever, pedal, or steering wheel directly operated by cable tension or hydraulic lines). Converted vehicles become mostly or entirely drive-by-wire because they are usually not intended to be freely converted back to or switchable back to a manually driven configuration. Even if some operation systems can be operated by a driver, the conversion will use the intervening robotic software, electronics, and actuators (for example, the usual cabled accelerator may be disconnected, so that an operator may input a speed choice via a joystick or the like).

Retrofitted vehicles that use the intervening robotic software, electronics, and actuators in place of a disabled mechanical connection cannot be considered equally as capable as a conventional vehicle. They may be fully or partially disabled upon failure of robotic control systems. It may be difficult for passengers in such a vehicle to recover from accidents, e.g., removing the vehicle from a ditch if it becomes stuck. In extreme scenarios, such as military operations, a converted "one-way" vehicle lacks flexibility.

Trivial software problems may strand a drive-by-wire vehicle, at least because there are no mechanical connections for a driver to resume use of the basic operational systems of the vehicle. Known converted-to-robotics vehicles inherit this problem, and cannot be readily changed into fully manual vehicles at whim. There are other problems—for example, converted vehicles do not drive or perform in the manner of an unmodified vehicle from an operator's perspective. Simple activities, such as parking the vehicle in a garage or transport, may be more difficult than doing so in an ordinary manual vehicle, requiring complex programming or use of tele-operation.

To the extent that the prior art has contemplated some of the problems and opportunities associated with vehicles useful in both autonomous modes and manual modes, ergonomic and intuitive operation is usually not the primary problem addressed. For example, although it may be contemplated that one manual operation or another may be associated with switching between autonomous and manual modes, specific, ergonomically determined mode switching methods are not well defined. Moreover, specific mechanical accommodation for intuitive operator use of mode switching systems is rarely discussed.

SUMMARY

Embodiments of this invention provide a vehicle, structures, systems, and methods, that are equally capable in autonomous and manual modes: (i) by incorporating enhanced safety in all such modes; (ii) by being readily restorable to fully mechanical manual operation and switchable to fully autonomous operation; (iii) by efficiently overlapping and combining components of autonomous control systems, manual mechanical control systems, and safety systems; or (iv) by having a human interface that simplifies processes of switching between autonomous and manual operations of a vehicle and enhances the operability and safety of vehicle use in either mode.

For example, one embodiment of the present invention comprises an autonomous vehicle including a mechanical vehicle control system capable of receiving manual inputs to operate the vehicle in a manual mode; a controller capable of generating autonomous control signals and/or mode switch signals; and at least one actuator mated to the mechanical vehicle control system by at least one electrically actuated clutch. The actuator may receive the autonomous control signals, and may operate the mechanical vehicle control system in an autonomous mode. Upon receipt of the mode switch signal, the actuator may disengage from the mechanical vehicle control system so that the vehicle operates in manual mode.

Thus the vehicle may be controlled by an operator in the vehicle using the mechanical vehicle control systems, or by a remote entity using the autonomous control system. Retaining manual functionality in this manner permits the operator experience to be indistinguishable from driving a vehicle with no autonomous modes. An operator accustomed to driving an unmodified vehicle or vehicle of the same base platform will experience substantially the same tactile feedback from driving the multi-role vehicle as from driving a normal non-autonomous vehicle (using steering, accelerator, brakes, or gear shifting) of the same kind Another embodiment of the present invention is a vehicle that includes a safety stop system that enhances safety in all modes and efficiently overlaps and combines components of autonomous control systems, manual mechanical control systems, and safety systems. The safety stop system removes power from all moving parts and from all parts that cause the vehicle to move. The e-Stop system is a subsystem of the safety stop system. It includes normally disengaged electrical clutches associated with each system that causes the vehicle to move and powers down all of the clutches in an E-Stop. In one embodiment, even though the E-Stop removes power from the clutches, it leaves power in the autonomous control system. After an E-Stop the vehicle is immediately available to be driven by the operator via the mechanical vehicle operation systems. Because supervisory and other autonomous control systems remain powered, however, autonomous functions such as sensing, communications, recording, monitoring, etc., are allowed to continue. E-Stop can be triggered by E-Stop switches within the vehicle, or by operator control members for the mechanical vehicle operation systems, such as the brake pedal.

The safety stop system also includes a controlled stop subsystem that stops the vehicle by removing power from only selected normally disengaged electrical clutches, while leaving other selected clutches active. An E-Stop could be initiated after a controlled stop, shutting down remaining moving parts. Optionally, a mode changeover switch for switching between manual mode and autonomous modes, or between autonomous modes, also removes power from selected normally disengaged electrical clutches, which may or may not stop the vehicle, and may also leave all of the remaining powered moving parts active.

In another embodiment of the present invention, a vehicle includes an autonomous mode starting system and method that provide features to enhance safety. The vehicle includes a parking control element that is set in a predetermined setting when the vehicle is parked. This predetermined setting should be commonly perceived as signifying disabling movement, e.g., should be part of the ordinary rules of the road and/or ordinary driver training For example, there may be a parking brake lever that is set in the "set position," so that the parking brake lever extends upwards and is visible from outside the vehicle. The vehicle's control system interprets the predetermined setting as permitting autonomous mode. There may be a disengaging mechanism that is responsive to signals sent by the control system. The disengaging mechanism disengages the mechanism preventing autonomous movement, yet leaves the control element in the predetermined setting that signifies disabled movement. So for example, the disengaging mechanism would release the brakes so that the vehicle can move, but would not release the parking brake lever, which would remain in the "set position." Optionally, the disengaging mechanism is electrical and would be deactivated under E-Stop or power loss conditions. It is optional, but advantageous, to leave the parking control electrically disengaged but mechanically "charged," or mechanically biased. In this manner, the parking control can be reengaged under electrical control or can fail-safe to a braking condition when electrical power is lost.

In another embodiment of the invention, a robotics safety system is provided for enhancing safety when the vehicle is in autonomous mode and a passenger desires to use manual mode. In autonomous mode electrical clutches are engaged to prohibit operation in manual mode. The vehicle has a set of manual operation members, such as levers and steering wheels, that are accessible to the passengers. When a passenger moves any of the manual operation members the electrical clutches disengage to permit operation in manual mode, and prohibit operation in autonomous mode. In another embodiment, the robotics safety system may include a rocker switch or other switch with autonomous and manual settings that passengers may use to switch between modes. Before switching between modes the robotics safety system first enters a safety mode. Preferably, this safety mode includes bringing the vehicle to a controlled stop with the engine running Following the safety mode, the robotics control system permits the passenger to control the vehicle by the same manual operation modes that were used to initiate the safety mode.

There may be alternate embodiments of the robotics safety system. The robotic control system can be controlled according to a set of detections that are classified as indicative of the exercise of human judgment, and responses to these detections can be given higher priority in behavior arbitration or action precedence than any programmed robotic reaction. In another embodiment, the robotic safety system may require verification that the vehicle is under control by an operator in the vehicle. This embodiment may be desirable in a hostile environment where it is not safe to bring the vehicle to a complete stop. In this instance, the robotic control system may combine a transition mode requiring verification that a human is in control, and/or in which robotic control system monitors whether the vehicle is under responsive control by an operator. In yet another embodiment, such as in a training situation, it may be desirable to shut down the engine. In that instance, when the vehicle is being controlled in autonomous mode and a passenger moves any of the manual operation members, the engine would shut down.

These illustrative embodiments are mentioned not to limit or define the invention, but to provide examples to aid understanding thereof. Illustrative embodiments are discussed in the Detailed Description, and further description of the invention is provided there. Advantages offered by the various embodiments of this invention may be further understood by examining this specification.

FIGURES

These and other features, aspects, and advantages of the this invention are better understood when the following Detailed Description is read with reference to the accompanying drawings, wherein.

FIGS. 13A-D are functional schematic diagrams of an illustrative control system according to different embodiments of the invention.

Figure 14A:
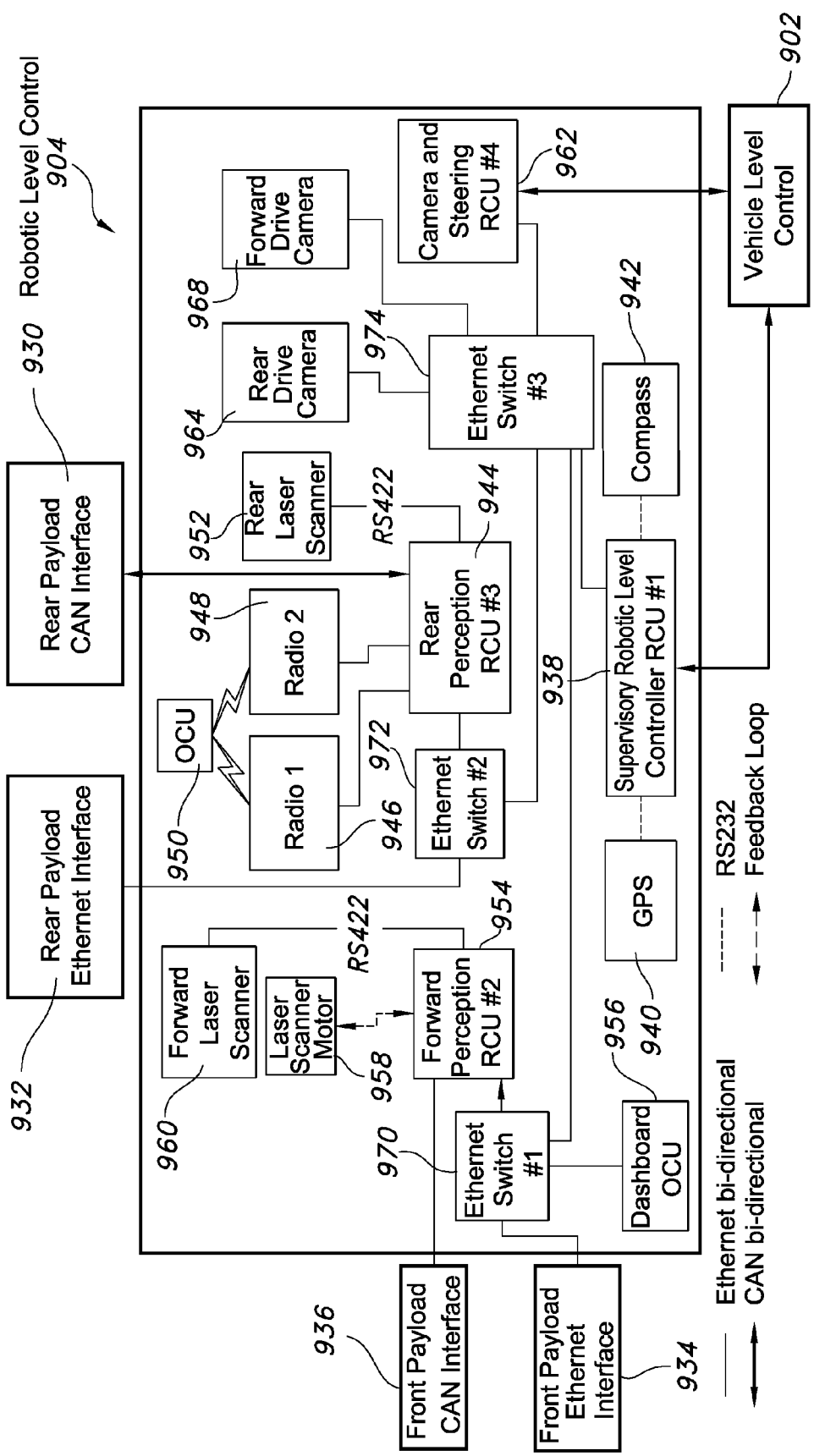
Figure 14B:
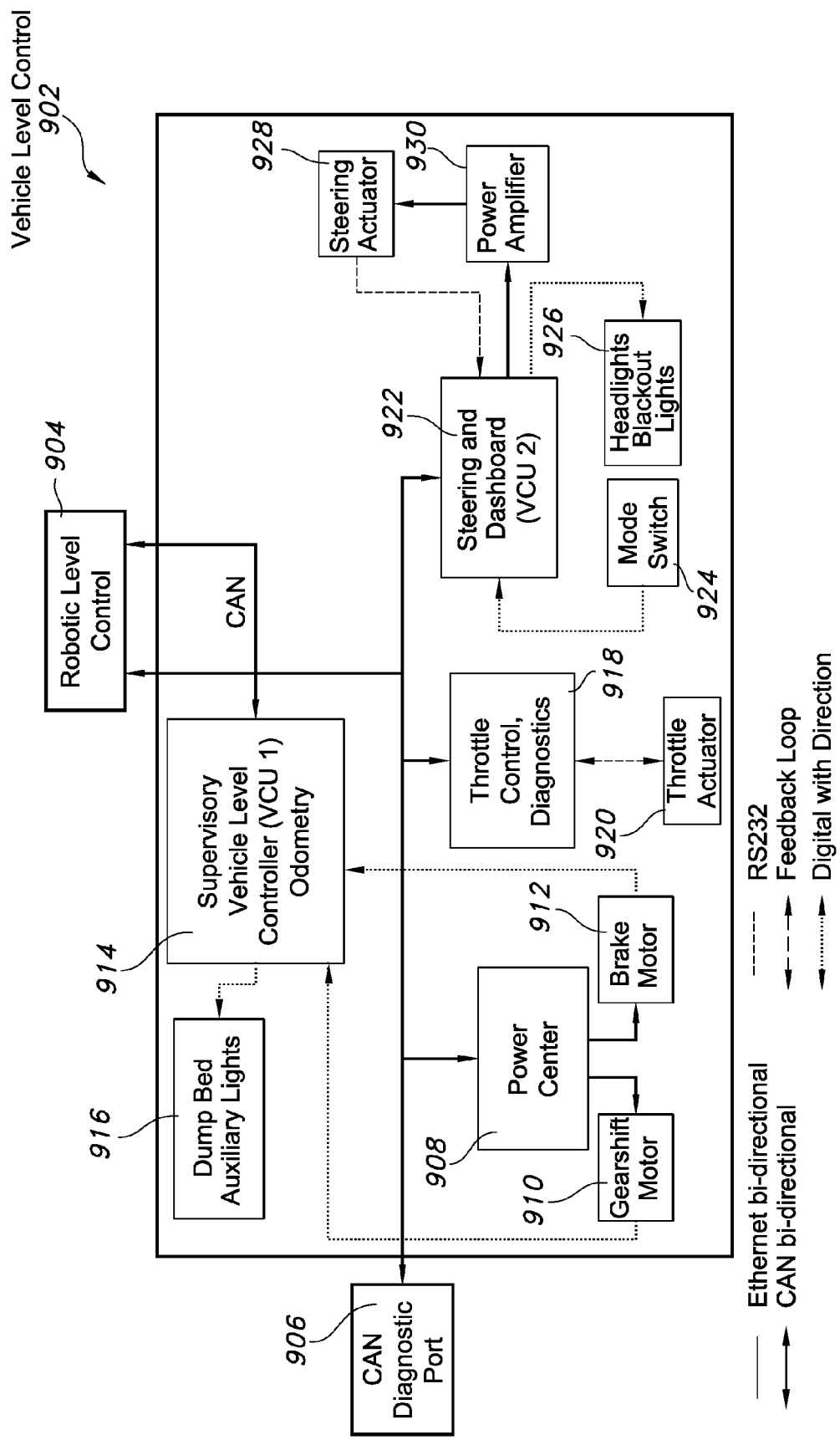

FIGS. 14A and 14B are functional schematic diagrams of an illustrative control system according to another embodiment of the invention.

Figure 15A:
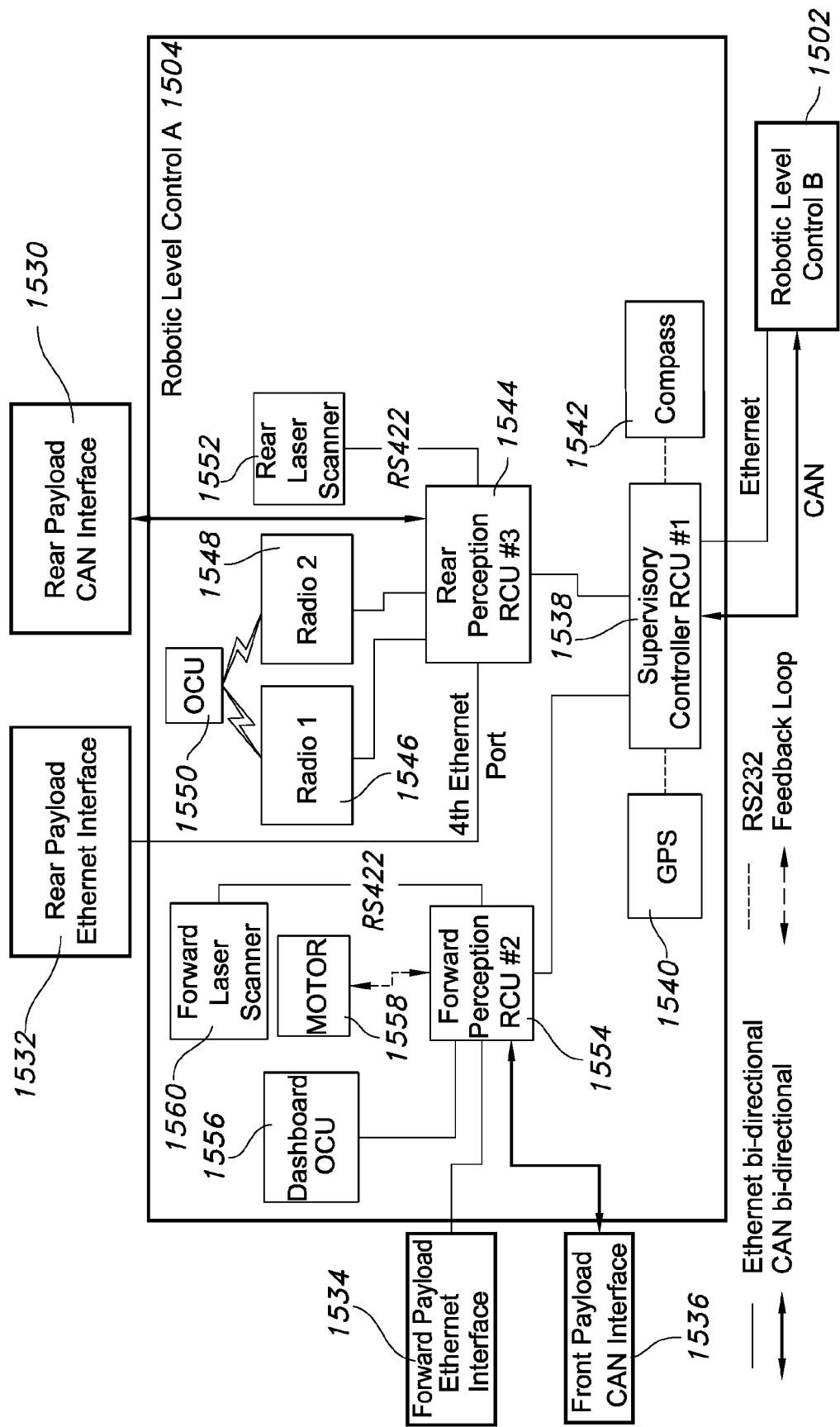
Figure 15B:
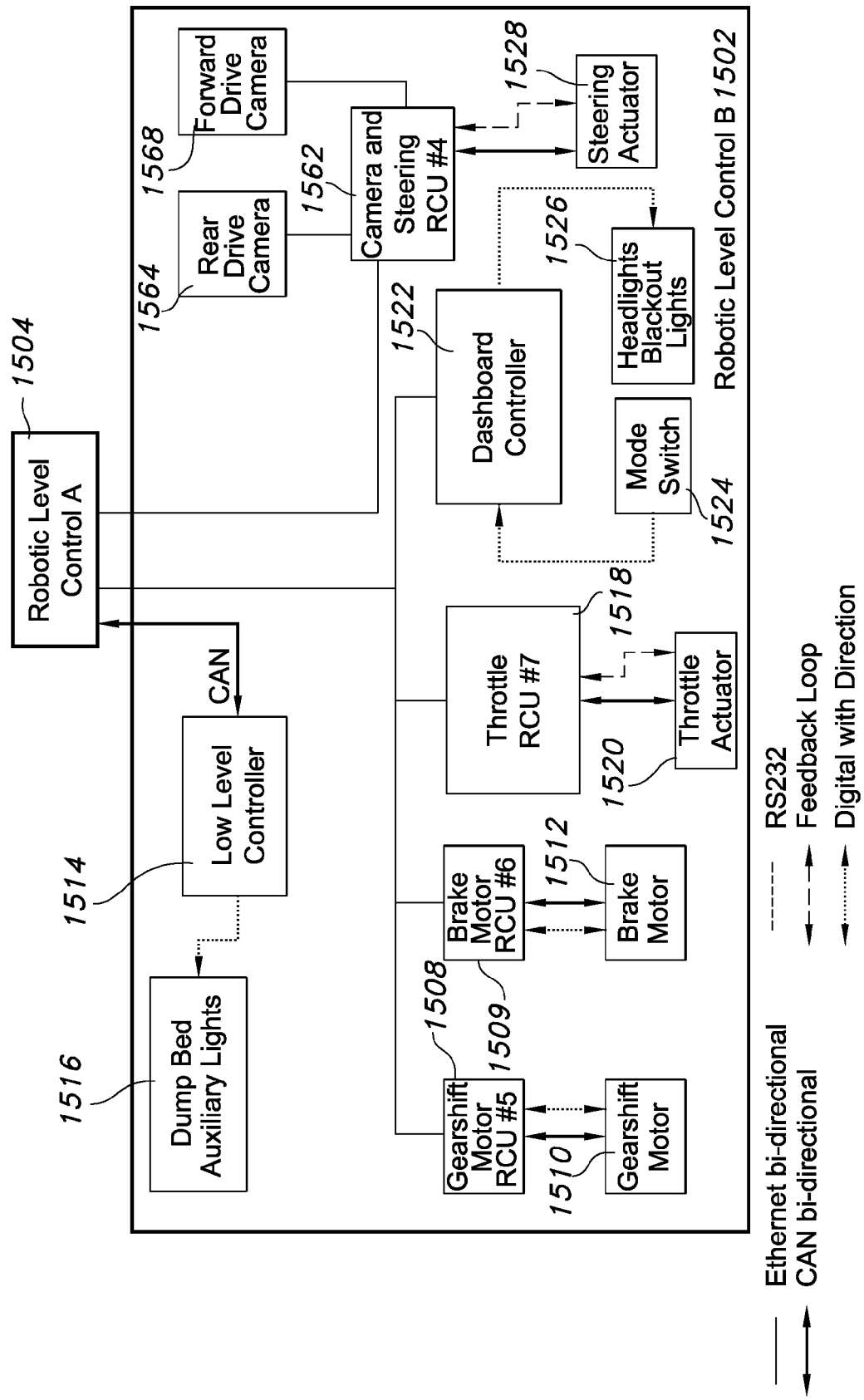

FIGS. 15A and 15B are functional schematic diagrams of an illustrative control system according to another embodiment of the invention.

DETAILED DESCRIPTION

Embodiments of this invention provide systems and methods for switching between autonomous and manual operations of a vehicle. More specifically, embodiments of this invention provide a vehicle, structures, systems, and methods, that are equally capable and in autonomous and manual modes: (i) by providing enhanced safety in all such modes; (ii) by being readily restorable to fully mechanical manual operation and switchable to fully autonomous operation; (iii) by efficiently overlapping and combining components of autonomous control systems, manual mechanical control systems, and safety systems; or (iv) by having a human interface that simplifies processes of switching between autonomous and manual operations of a vehicle and enhances the operability and safety of vehicle use in either mode.

Illustrative Vehicle

Embodiments of the present invention may be used in a variety of vehicles, such as automobiles, trucks, and utility vehicles. FIG. 1 is a block diagram of an illustrative vehicle 102 in one embodiment of the present invention. The vehicle 102 shown in FIG. 1 is a six wheeled, diesel powered utility vehicle, such as a Gator™ vehicle manufactured by Deere & Company of Moline, Ill.

The vehicle 102 shown comprises operational systems, including a steering system 104, a braking system 106, a throttle system 108, and a transmission system 110. Each of these systems 104-110 preferably comprises a mechanical input for operation in a manual mode, a mechanical linkage for transferring force to the relevant mechanism, and an actuator for operation in an autonomous mode. "Mechanical" and "mechanical linkage" as used herein include fluid power systems unless fluid power systems are specifically excluded. The autonomous mode is a mode in which at least a portion of the vehicle is under at least partial computer control and may comprise, for example, robotic or remote operation, such as tele-operation. In tele-operation, a user pilots the vehicle 102 remotely using a remote monitor and control system, referred to herein as an Operator Control Unit (OCU). The remote monitor may rely on cameras or other sensors for determining the vehicle's 102 position and status.

Figure 2:
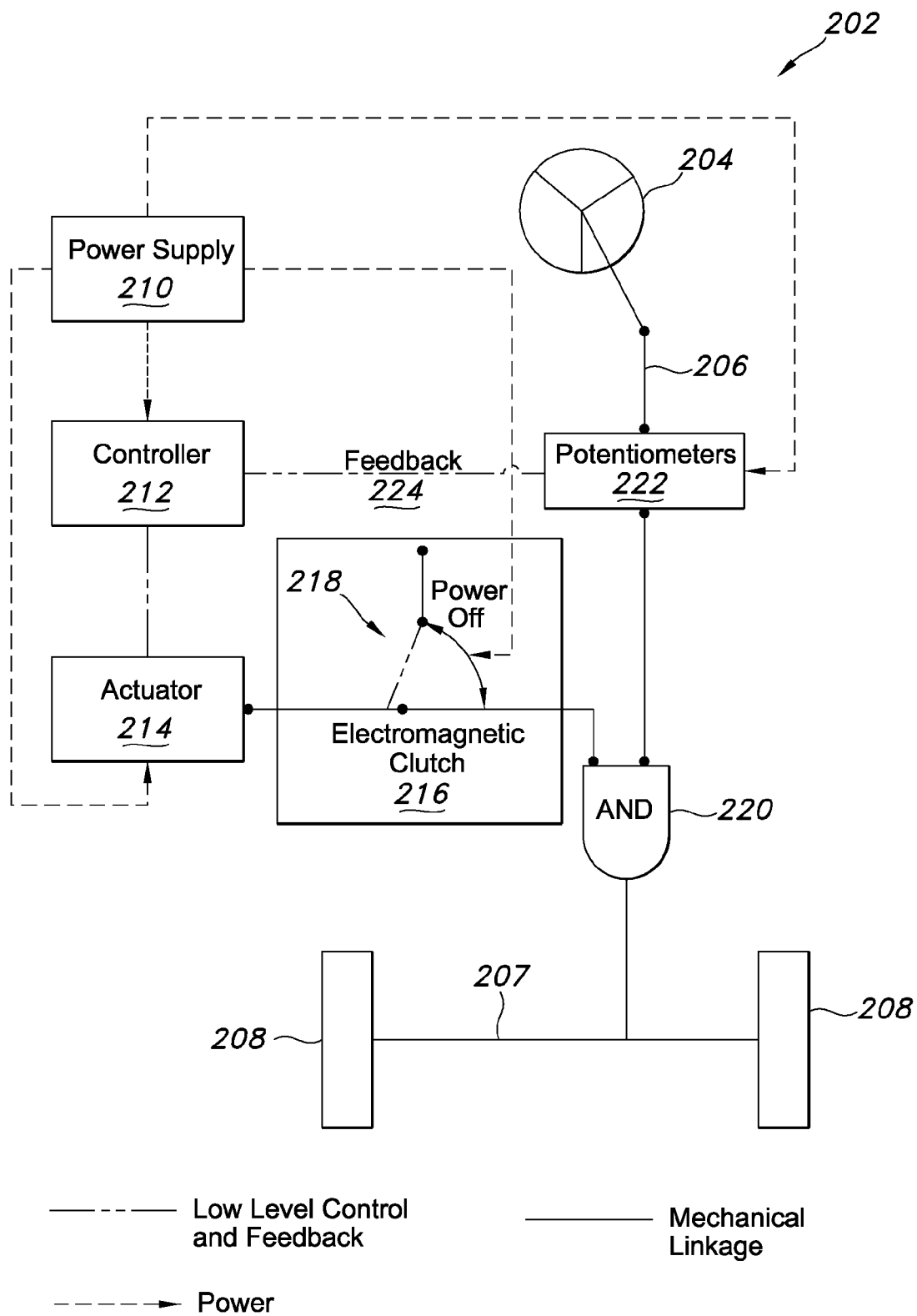
FIG. 2 is a block diagram illustrating a steering system in one embodiment of the invention.
Figure 3:
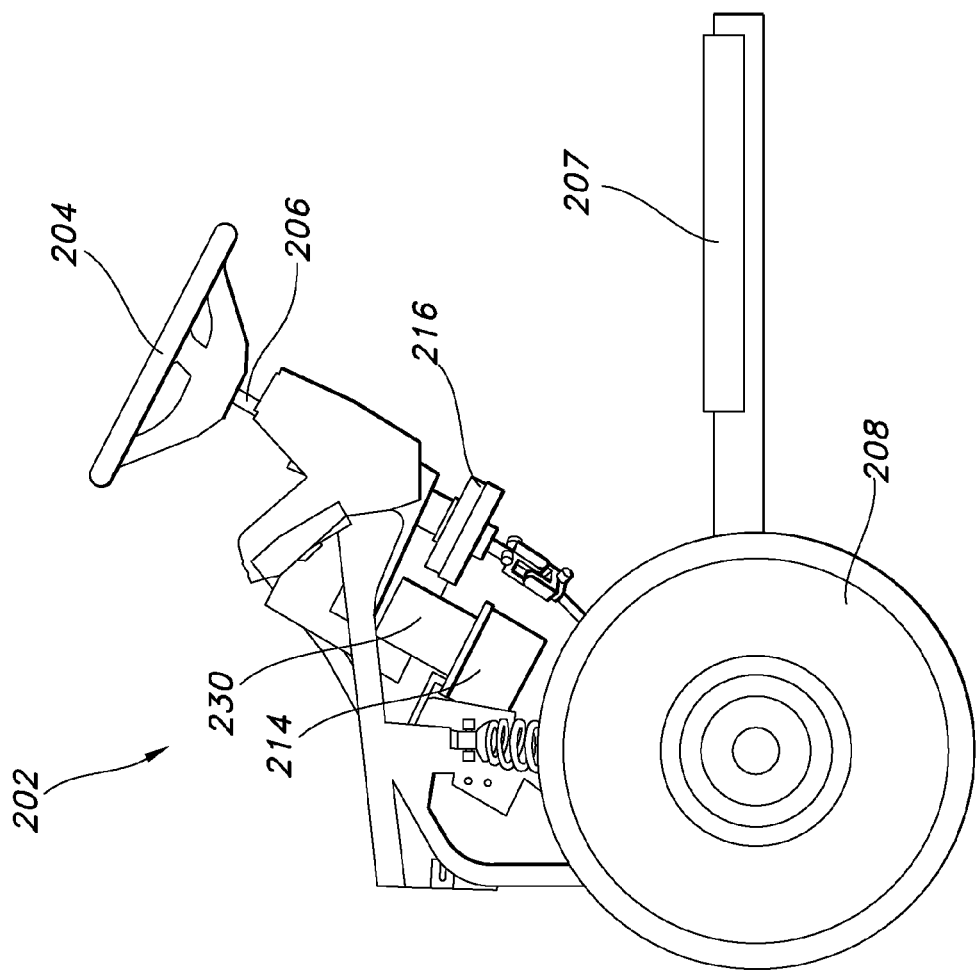
FIG. 3 is a diagram illustrating a partial side view of a steering system in one embodiment of the invention.
Figure 4:
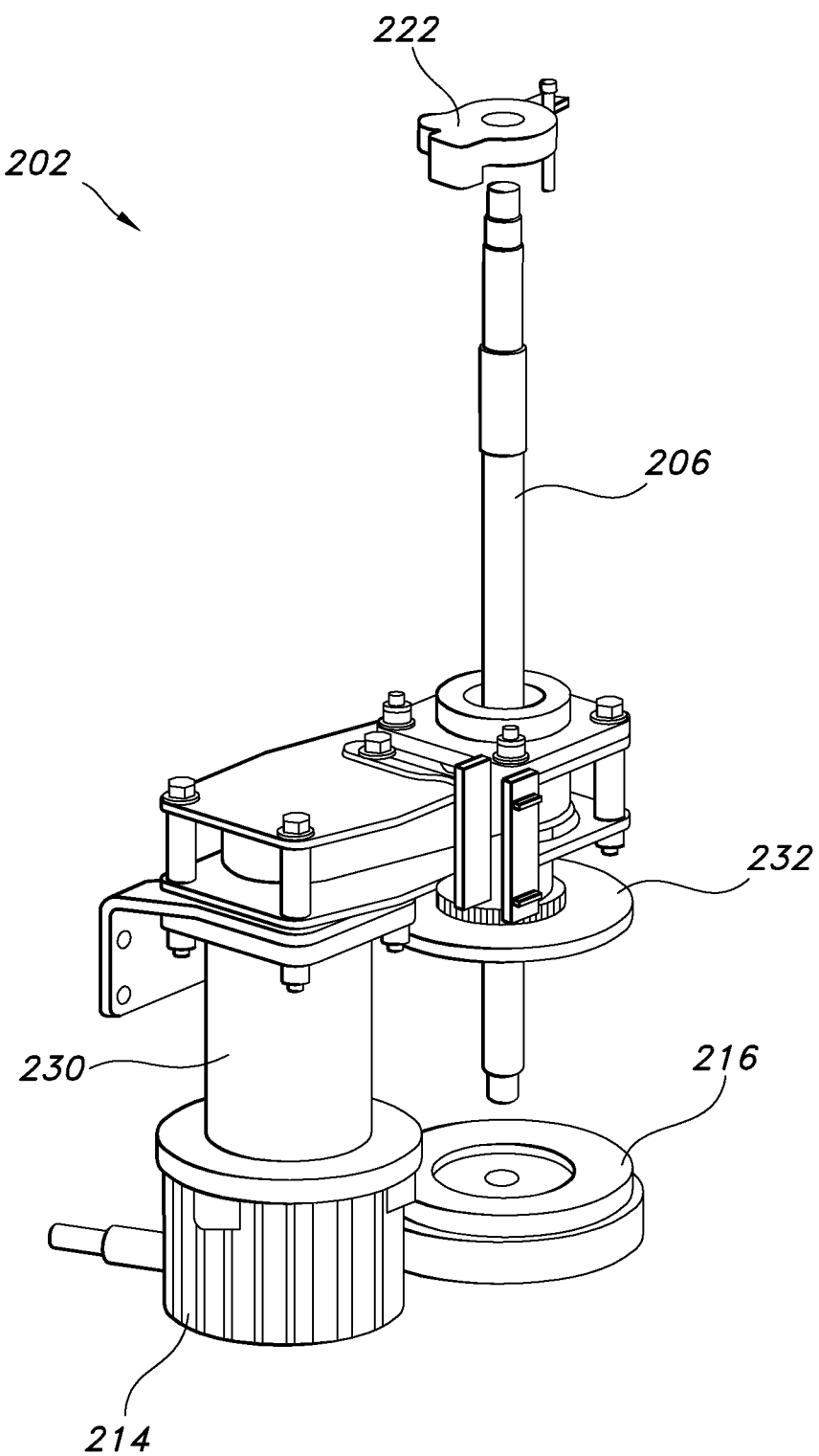
FIG. 4 is a diagram illustrating an exploded view of the steering system in FIG. 3.

Operation in the manual mode may comprise providing mechanical input and having the mechanical input translated to a force on the controlled system. For example, as illustrated in FIG. 1 the steering system 104 is attached or in communication with a steering wheel 112 for manual operation. As illustrated in FIGS. 2-4 when a driver turns the steering wheel 204, a shaft 206 attached to the steering wheel 204 turns a gear that is intermeshed with a rack 207. The rack 207 is attached to the front wheels 208 of the vehicle 102 and causes the wheels 208 to turn in the appropriate direction based on the mechanical input. For the purposes of this disclosure, the steering system 202 includes a steering mechanism (which may be one of, e.g., rack and pinion; ball and nut; cam and roller, lever, or peg, i.e., the family of mechanisms commonly known as a steering mechanism in the art).

Similarly, a brake pedal 114 and parking (emergency) brake lever 116 are attached or in communication with the braking system 106. When the brake pedal 114 is pushed or the parking brake lever 116 is pulled or otherwise set, it applies pressure to a mechanical brake in the transaxle of the vehicle 102. Typically, the parking brake lever 116 connects via a separate cable to the mechanical brake, and can be used alternatively to actuate the mechanical brake. In some cases, a separate brake mechanism is provided for the parking brake lever 116. It should be noted that setting the parking brake lever upon leaving the vehicle 102 is recognized as a necessary safety "rule of the road," so much so that local ordinances and laws often define it as one of the legally mandated steps for leaving an unattended vehicle 102. Most driver training naturally teaches this rule of the road, and most adults are accustomed to setting a parking brake lever 116 (or pedal 114) upon leaving a vehicle 102.

However, in normal manual operation, the braking system 106 is actuated by the brake pedal 114 via its own connection (e.g., mechanical or electrical); and in normal autonomous operation, the brake system 106 is either actuated directly by autonomous control or via the brake pedal 114 connection.

The throttle system 108 is similarly actuated, i.e., via a mechanical connection. Alternatively, each mechanical input may be translated to an electrical signal before input to the operational system. For example, an accelerator pedal 118 is in communication with the throttle system 108. When the accelerator pedal 118 is depressed, a sensor (not shown) sends a signal to the throttle system 108, indicating the level of depression. The throttle system 108 uses the signal to determine the volume of fuel/air mixture to supply to the engine of the vehicle 102.

The vehicle 102 also comprises a gearshift lever 120 for selecting forward, neutral, or reverse (FNR) gears. In more complex vehicles 102, the gearshift lever 120 may select different gear ratios as well. When the user moves the gearshift lever 120, a shaft attached to the lever 120 and the transmission (not shown) is moved, causing the transmission to switch gears.

Although these operational systems are described as having mechanical-to-mechanical, or mechanical-to-electrical operation, different types of systems may be employed. For instance, a brake-by-wire system may be utilized in an embodiment of the present invention. In such a system, a sensor configured to sense the movement of the brake pedal 114 would cause actuation of the brakes without a mechanical link. That is, while some expressions of the invention permit some or all operational systems to be operated by a non-mechanical input, other expressions contemplate an arrangement in which essentially every major operational system (steering 104, braking 106, throttle 108, and transmission 110) has a mechanical input, which has advantages as discussed herein.

Each of the operational systems includes at least one actuator. As shown in FIGS. 3-4, for instance, the steering system 202 may comprise an actuator 214 embodied as a motor capable of turning the steering shaft 206. The actuators are utilized for operation of the vehicle 102 in an autonomous mode. The operational systems allow for fast, automatic transition from autonomous mode to manual mode. The transition from autonomous to inoperative mode may be caused by an Emergency Stop (E-Stop), as will be discussed in more detail later. "E-Stop" is a term of art used herein, is a species of "controlled stop," and is distinct from other controlled stops at least in that a reset operation is necessary (often resetting a "mushroom" button), before any operation, manual or autonomous, is restored. This does not mean that an E-Stop button is directly connected to actuators, but many implementations do so. In many cases, based on the state of the vehicle 102, a controlled stop or an E-Stop may be a sequence of actions is initiated that brings the vehicle 102 quickly and safely to a rolling stop. An E-Stop may require a reset; a controlled stop may not. On the other hand, a transition from autonomous to manual mode can be caused by specific controls (a changeover switch) or by operator intervention by use of an operator intervention detector on a manual control (e.g., the operator moves the brake pedal 114, steering wheel 112, gearshift lever 120, or accelerator pedal 118). An operator intervention detector can be used to initiate a controlled stop, or to permit operator "takeover." If the operator is to "takeover" the vehicle 102 via a changeover switch or operator intervention (i.e., while moving, manual operation is engaged, autonomous is disengaged), this can be set preemptively (manual control overrides without delay), or to warn the operator before permitting assumption of manual control.

Figure 5:
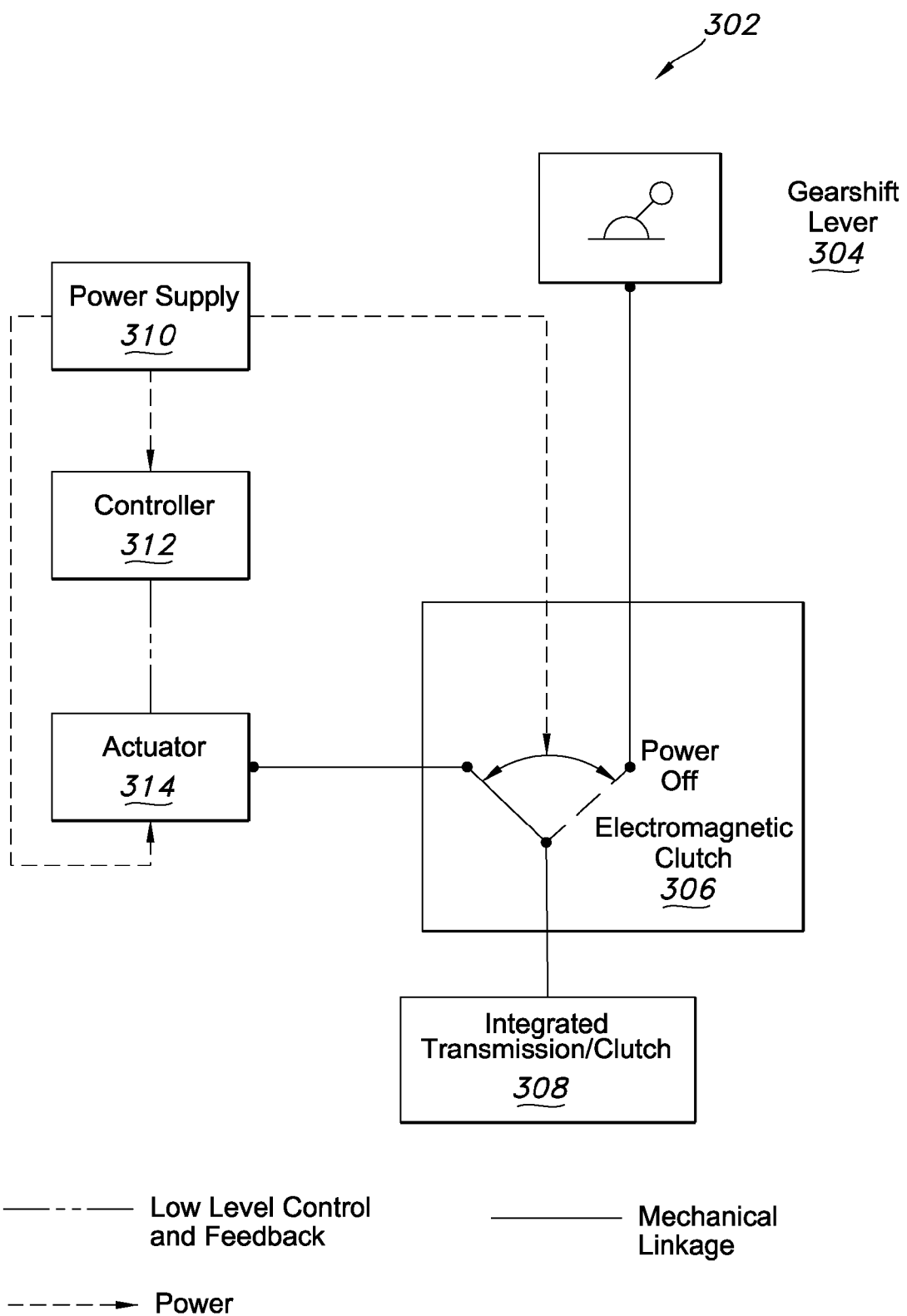
FIG. 5 is a block diagram illustrating a transmission system in one embodiment of the invention.
Figure 8:
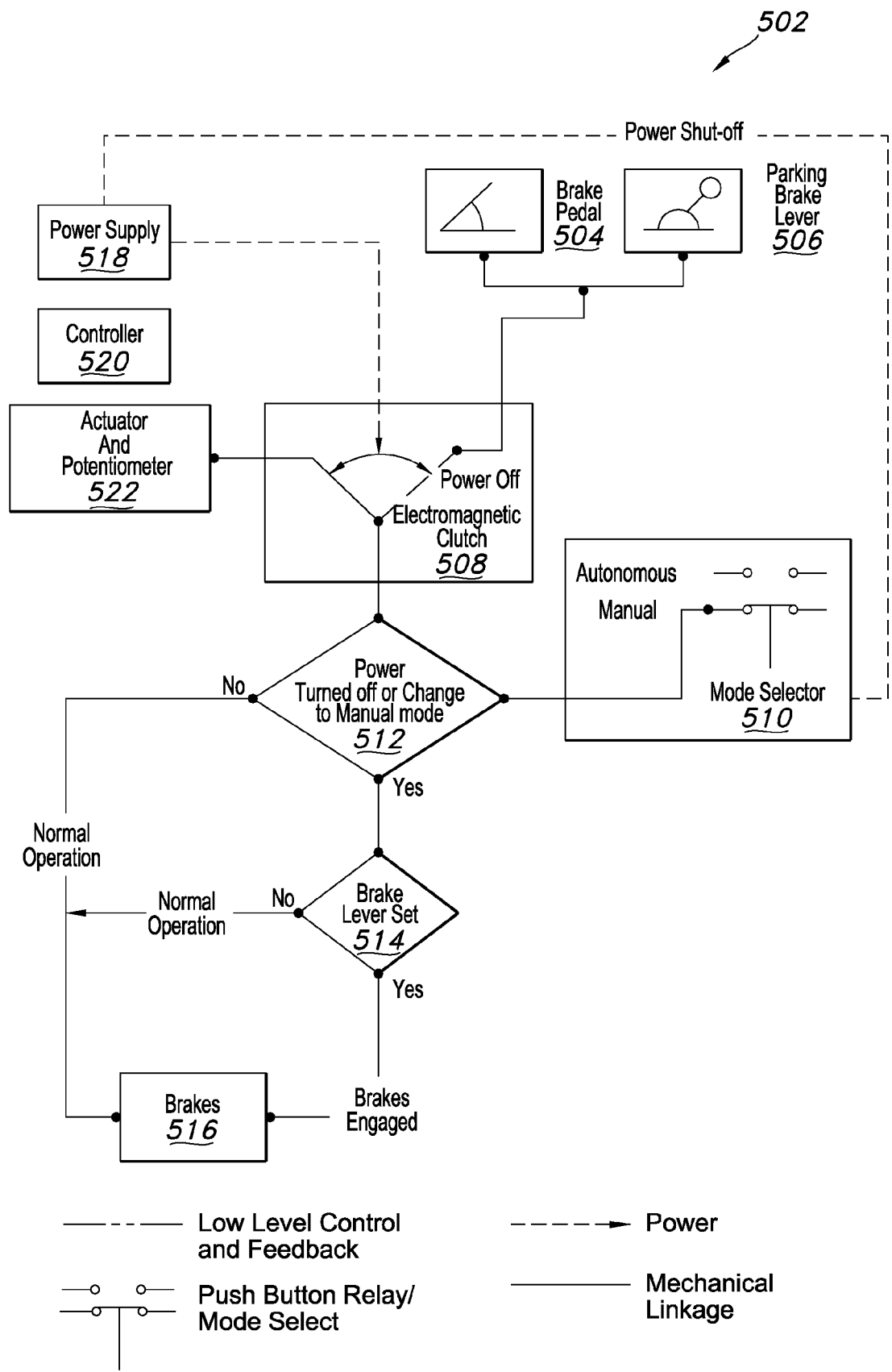
FIG. 8 is a combination block and flow diagram illustrating a braking system in one embodiment of the invention.

In the embodiments illustrated in FIGS. 2, 5, and 8, three clutches are used, one each for the steering system 202, transmission system 302, and the braking system 502. Alternatively, the throttle system 402 is also controlled by an electromagnetic clutch. In manual mode, the clutches disengage the actuators from controlling the vehicle 102, removing interference from robotics in manual mode. In other words, the mechanical connection between the user's gearshift lever 120, steering wheel 112, or pedal 114 and the mechanical end system is largely unfettered. The user, thus, gets the manual experience that he expects and the degree and character of tactile feedback are similar to a non-autonomous vehicle 102 of the same form factor.

For example, one embodiment of the present invention comprises an autonomous vehicle 102 including a mechanical vehicle control system capable of receiving manual inputs to operate the vehicle 102 in a manual mode; a controller capable of generating autonomous control signals; and at least one actuator configured to receive the autonomous control signals and operate the mechanical vehicle control system in an autonomous mode, wherein the controller is configured to send a mode switch signal to disengage the actuator from the mechanical vehicle control system so that the vehicle 102 operates in manual mode.

Retaining manual functionality in this manner permits the operator experience to be indistinguishable from driving a vehicle with no autonomous modes, even following an E-Stop operation. An operator accustomed to driving an unmodified vehicle or vehicle of the same base platform will experience precisely the same tactile feedback from driving the multi-role vehicle as from driving a normal non-autonomous vehicle (using steering, accelerator, brakes, or gear shifting) of the same kind The vehicle 102 also comprises a vehicle control unit (VCU) 122. The vehicle control unit 122 receives input and utilizes the input to determine how to control each of the operational systems 104-110. For instance, the vehicle control unit 122 may receive an input that indicates that the vehicle 102 should be turned to the right. In response the vehicle control unit 122 outputs a control signal to the steering system 104 to cause the actuator 214 to turn the steering shaft 206.

The vehicle 102 also comprises a robotic control system (RCS) 124. The robotic control system 124 receives a variety of inputs from various sources, such as a Global Positioning System (GPS) and other sensors and uses a combination of software and hardware to determine how to control the vehicle 102. The robotic control system 124 then outputs appropriate signals to the vehicle control unit 122 to cause the vehicle 102 to operate as desired. In some embodiments, the vehicle control unit 122 and robotic control system 124 may comprise a single control unit. In other embodiments the vehicle control unit 122 may comprise multiple control units, also called robotic control modules, and the robotic control system 124 may comprise multiple control units. Use of separate units allows more flexibility in configuring the vehicle 102. Also, the robotic control system 124 can be configured to operate with multiple vehicle control units 122 so that the robotic control system 124 can be moved from vehicle 102 to vehicle 102. For instance, if one vehicle 102 is rendered inoperable, the robotic control system 124 can be removed and installed in another vehicle 102.

Both the vehicle control unit 122 and robotic control system 124 comprise a processor. The processor comprises a computer-readable medium, such as a random access memory (RAM) coupled to the processor. The processor executes computer-executable program instructions stored in memory, such as vehicular or robotic control algorithms. Such processors may comprise a microprocessor, an application-specific integrated circuit (ASIC), and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other suitable medium from which a computer processor can read instructions. Also, various other forms of computer-readable media may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

The vehicle 102 also comprises a power supply 126. In the embodiment shown in FIG. 1, the power supply 126 is a separate power supply for the vehicle operations systems 104-110, vehicle control unit 122, and robotic control system 124. The engine, lights, and other systems of the vehicle 102 may utilize a separate power supply. In other embodiments, a single power supply system 126 is used for the entire vehicle 102. It should be noted that the VCU 122 can be replaced with an additional RCU (e.g., RCU #5), or a combination of some RCU's replaced with one or more additional VCU's 122. To the extent that each of the RCU and VCU have overlapping capabilities, "RCU" and "VCU" as used herein are often interchangeable.

In one such embodiment, the vehicle 102 is utilized as a military vehicle. As defined herein, a military vehicle is distinct from a civilian vehicle in that it is not necessarily subject to civilian transport laws (e.g., it is not necessarily highway-licensable), and therefore can be made capable of missions that would "break the law," such as operating autonomously on any path, including civilian roads and highways. The military vehicle may be sent to a front-line position in an autonomous mode. When it arrives, trained military personnel would typically operate the appropriate manual-to-autonomous switch. Untrained military personnel may enter the vehicle 102 and press the E-Stop button, causing the vehicle 102 to exit autonomous mode and become inoperable as an autonomous unit until reset. The personnel are then able to drive the vehicle 102 in a conventional manner. For instance, they can drive the vehicle 102 from the front line to a position in the rear.

Illustrative Control System

Figure 13A:
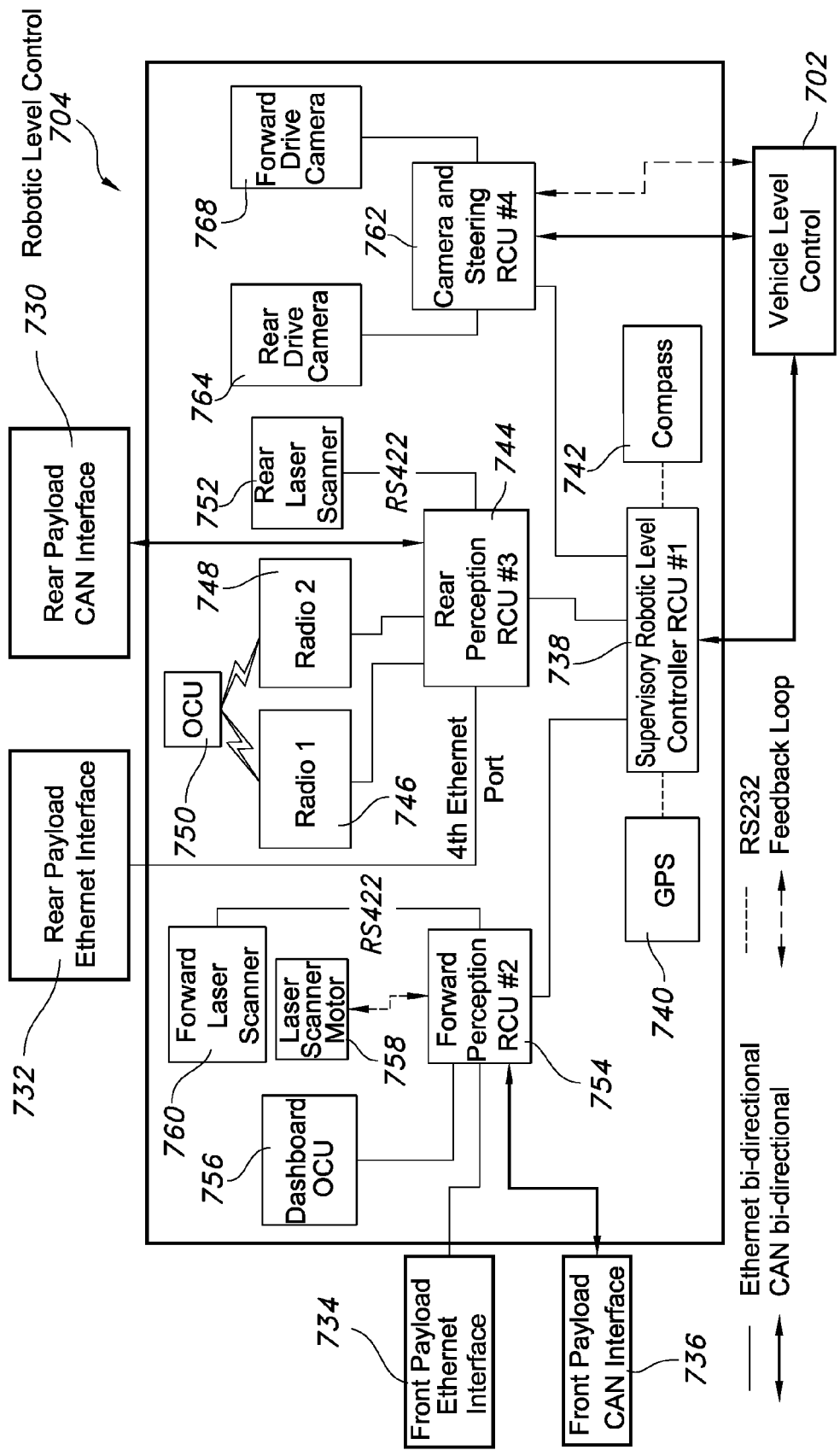
Figure 13B:
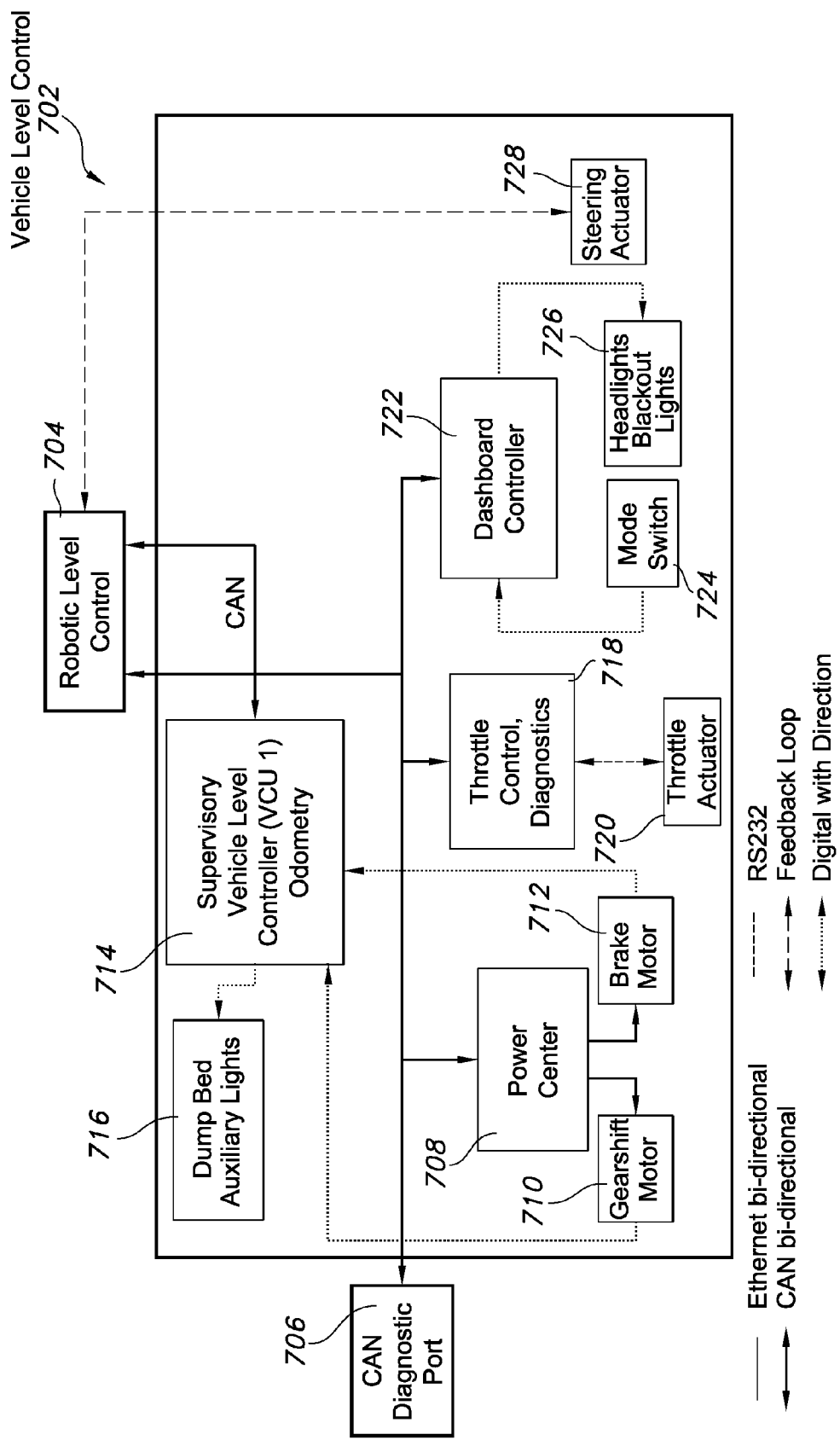

FIG. 13A is a diagram of a robotic control system (RCS) 124, for example, the robotic level control 704, in one embodiment of the present invention. FIG. 13B is a diagram of a vehicle control unit 122, for example the vehicle level control 702, in one embodiment of the present invention. The two sections 702, 704 operate as a hierarchy where the robotic level control 704 has limited direct access to actuators that are operated by existing vehicle level control 702. In contrast, in situations where robotic level control 704 instead replaces or subsumes vehicle level control 702, robotic level control 704 can substantially directly drive vehicle operation systems via the actuators. The robotic level control 704 comprises four robotic control modules or robotic control units (RCUs) 738, 754, 744, and 762 and various sensors. The robotic level control 704 receives various inputs from scanners, creates an obstacle map, determines control of the vehicle 102, and sends control information to the supervisory vehicle level controller (VCU #1) 714 and to the dashboard controller 722 (shown in FIG. 13B) that control various operational systems of vehicle 102.

The vehicle level control 702 may optionally comprise one external interface, a controller area network (CAN) diagnostic port 706. The vehicle level control 702 also comprises a power center 708 or other small load center module, such as a Siemens power center manufactured by Siemens Corporation. The power center 708 receives CAN communication from the robotic level control 704 and then translates that CAN communication into control signals, which it sends to the gearshift motor 710 and the brake motor 712. The gearshift motor 710 and brake motor 712 are the actuators for the control of the transmission and brake systems, 110, 108, respectively.

The vehicle level control 702 also comprises a supervisory vehicle level controller (VCU #1) 714. In one embodiment, the supervisory vehicle level controller (VCU #1) 714 has odometry sensors and is able to determine the velocity of the vehicle 102 if one of the odometer sensors on the wheels 208 fails. The supervisory vehicle level controller (VCU #1) 714 is in communication with various systems of the vehicle 102. For instance, the supervisory vehicle level controller (VCU #1) 714 is in communication with the dump bed, auxiliary lights, and annunciator 716. In one embodiment, the auxiliary lights may be beacon lights. The supervisory vehicle level controller (VCU #1) 714 is also in communication with the gearshift motor 710 and the brake motor 712.

The vehicle level control 702 also optionally comprises a throttle controller 718 for throttle control and diagnostics, such as, for example, an APECS® model throttle controller provided by Woodward Governor Company, of Rockford Ill. The throttle controller 718 is in communication with the throttle actuator 720. The throttle controller 718 provides actuator signals to and receives feedback from the throttle actuator 720. In other implementations, this role may be served by a robotic control unit, motor, and electromagnetic clutch.

The vehicle level control 702 also comprises a dashboard controller 722. The dashboard controller 722 provides control for a mode switch 724 and for headlights and blackout lights 726. The vehicle level control 702 also comprises the steering actuator 728.

The robotic level control 704 also comprises external interfaces. The external interfaces of the robotic level control 704 shown in FIG. 13A comprise a rear payload CAN interface 730 and a rear payload Ethernet interface 732. The external interfaces also comprise a front payload CAN interface 736 and Ethernet interface 734.

Various elements of the vehicle level control 702 are in communication with elements of the robotic level control 704. For instance, the supervisory robotic level controller (RCU #1) 738 is in communication with the power center 708, throttle controller 718, and dashboard controller 722. The supervisory robotic level controller (RCU #1) 738 receives input from various sensors and provides commands for operation of a vehicle 102 in an autonomous mode. U.S. patent application Ser. Nos. 10/972,082; 10/971,718; and 10/971,724, incorporated by reference in their entireties herein, describe exemplary autonomous modes and control thereof.

In the embodiment shown in FIG. 13A, the supervisory robotic level controller (RCU #1) 738 receives input from a GPS navigation/communication system 740 (such as is available from NavCom Technology, Inc. of Torrance, Calif.) and from a compass 742. These sensors 740, 742 provide position and heading information to the supervisory robotic level controller (RCU #1) 738 for navigation purposes. Embodiments of the present invention may comprise other sensors as well. For instance, one embodiment comprises an inertial measurement unit (IMU), which measures acceleration of the vehicle 102 in each direction. The supervisory robotic level controller (RCU #1) 738 is also in communication with the rear perception robotic control module (RCU #3) 744. The rear perception robotic control module (RCU #3) 744 receives sensor input via the rear payload CAN 730 and Ethernet 732 interfaces.

In one embodiment, when a sensor, such as the rear laser scanner 752, fails or signals from the sensor are not received, the system is designed so that signals mimicking an object completely blocking the sensor are created. This way if, for example, a rear laser scanner 752 fails, the vehicle 102 cannot move in a reverse direction, discussed below in part as the "range guard."

The rear perception robotic control module (RCU #3) 744 is in communication with a pair of radio receivers, radio (1) 746 and radio (2) 748. Radio (1) 746 may be 900 MHz, for example, and may be an EH900 model manufactured by Nova Engineering, Inc. of Cincinnati, Ohio. Radio (2) 748 may be 2.4 GHz and may be 802.11b-compatible. The radios 746, 748 allow the rear perception robotic control module (RCU #3) 744 to receive commands from an operator control unit (OCU) 750, and to transmit video and other signals. The OCU 750 may be used, for example, for tele-operation of the vehicle 102 in an autonomous mode. The rear perception robotic control module (RCU #3) 744 is also in communication with the rear laser scanner 752, such as is manufactured by Sick AG of Germany.

The supervisory robotic level controller (RCU #1) 738 in the embodiment shown in FIG. 13A is also in communication with a forward perception robotic control module (RCU #2) 754. The forward perception robotic control module (RCU #2) 754 is in communication with the dashboard operator control unit (OCU) 756. In the embodiment shown, the dashboard OCU 756 comprises a personal digital assistant. One example would be the TDS Recon™ model as is manufactured by Tripod Data Systems of Corvallis, Oreg. The forward perception robotic control module (RCU #2) 754 is also in communication with a laser scanner motor 758 and a forward laser scanner 760.

The supervisory robotic level controller 738 is also in communication with a camera and steering controller (RCU #4) 762. The camera and steering controller (RCU #4) 762 is in communication with a rear drive camera 764 and a forward drive camera 768. The cameras 764, 768 may be the SNC-CS3N model manufactured by Sony Electronics, Inc. of San Diego, Calif. The camera and steering controller (RCU #4) 762 is also in two-way communication with the steering actuator 728 and supervisory vehicle level controller (VCU #1) 714 of the vehicle level control 702. Finally, the camera and steering controller (RCU #4) 762 is able to control the brake motor 712 via the supervisory vehicle level controller (VCU #1) 714. The camera and steering controller (RCU #4) 762 may send and receive CAN signals between the supervisory vehicle level controller (VCU #1) 714, which in turn may send and receive CAN signals between the power center 708. Next, the power center 708 sends control signals to the brake motor 712. Accordingly, the camera and steering controller (RCU #4) 762 controls the brake motor 712 via the supervisory vehicle level controller (VCU #1) 714 and the power center 708.

The layout of the various controllers and sensors shown in FIGS. 13A and 13B may be implemented in a variety of ways in embodiments of the present invention. For instance, the various controllers may be combined or split in various ways depending on the number and types of sensors used and depending on the configuration of the vehicle. Also, the various sensors and instruments may be utilized in various ways. For instance, embodiments of the present invention may utilize sensor fusion to operate efficiently and effectively. Sensor fusion allows the vehicle to operate even when certain sensors are inoperative.

Figure 1A:
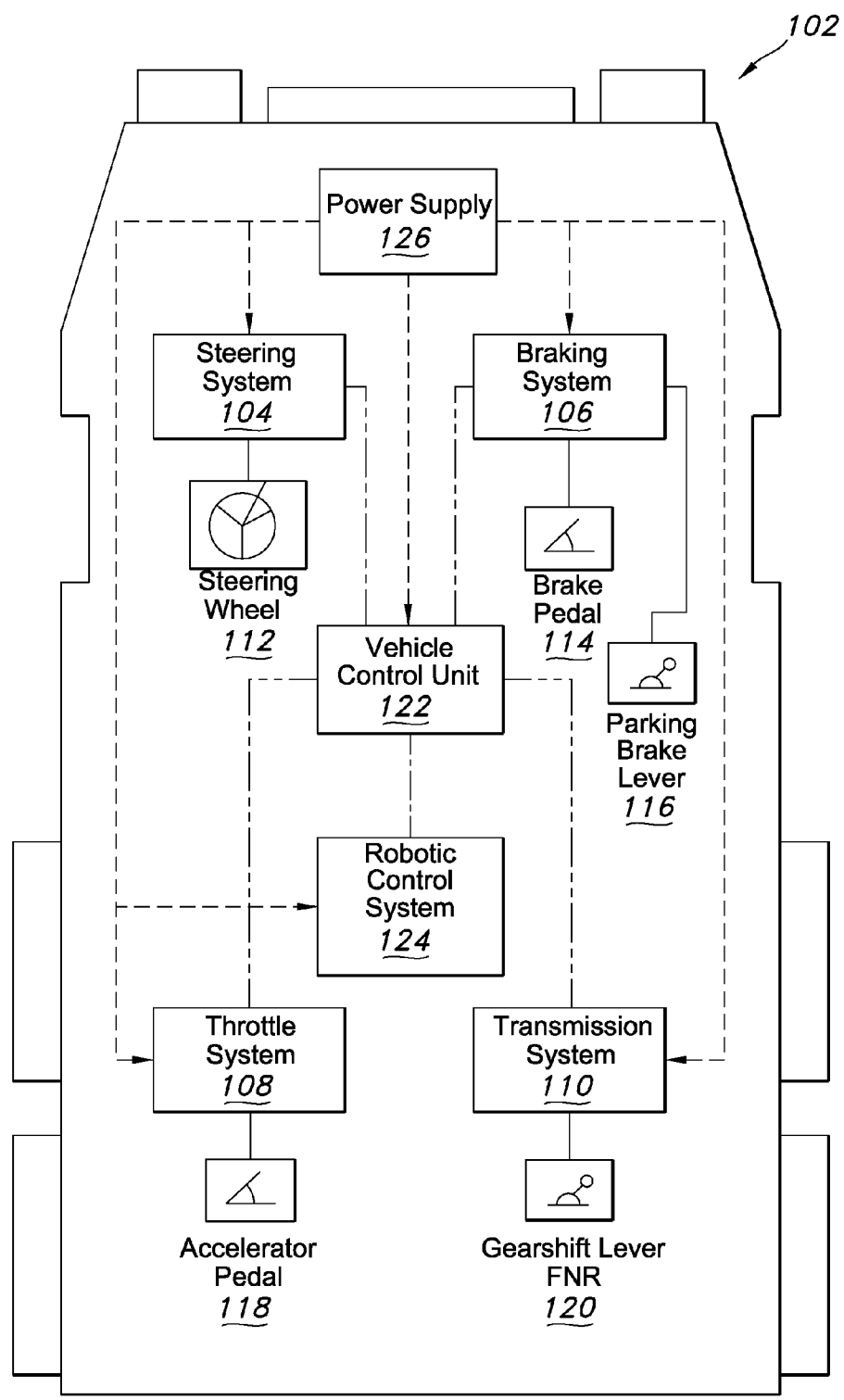
FIGS. 1A-1C are block diagrams of illustrative vehicles according to various embodiments of the invention.
Figure 1B:
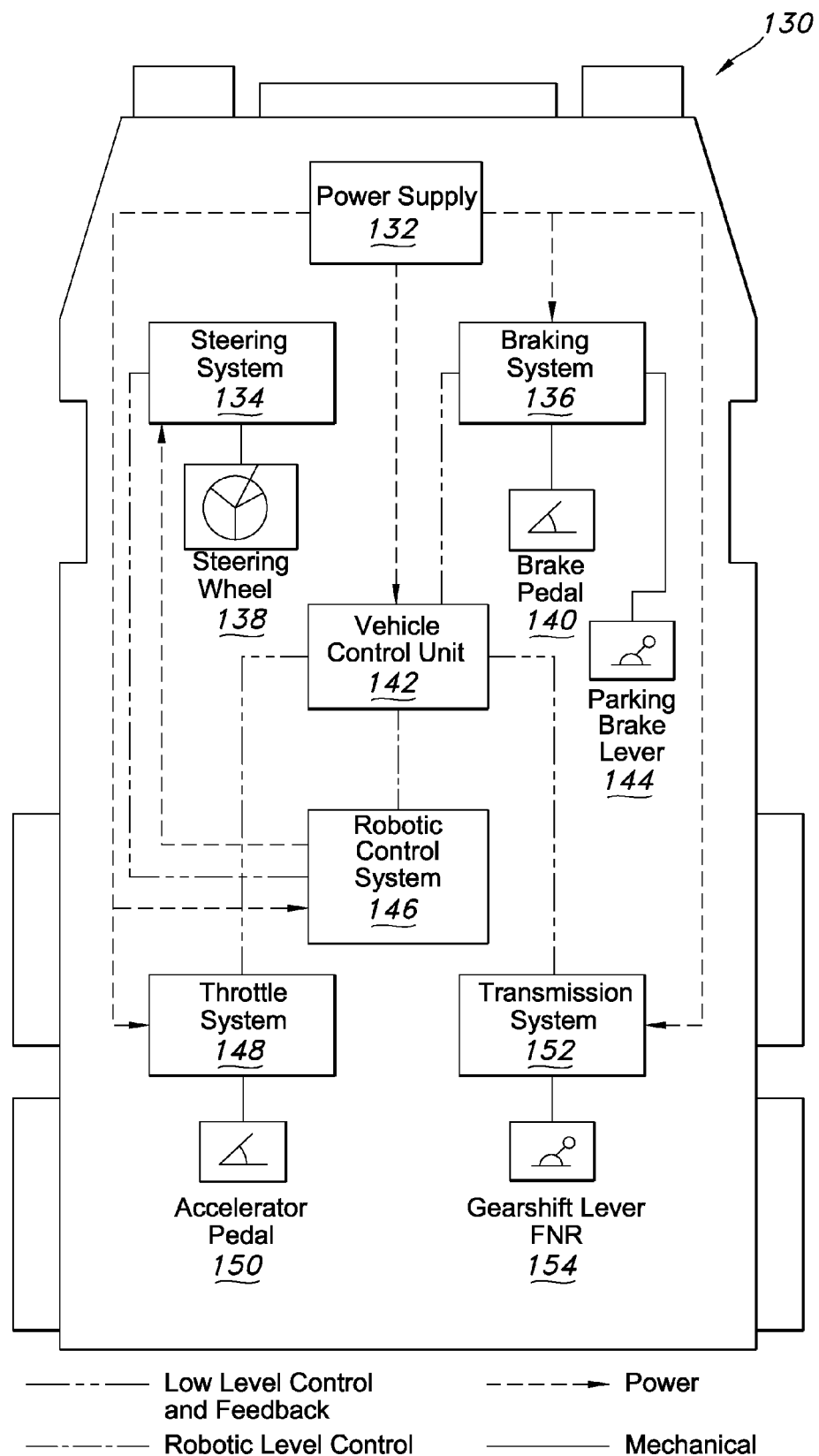

FIG. 1B shows an alternate embodiment of a vehicle 130 with a steering system 134 that is not controlled by the vehicle control unit 142 as is the embodiment in FIG. 1A. Instead, the steering system 134 in FIG. 1B is controlled by a robotic control unit (not shown) within the robotic control system 146. The robotic control unit (not shown) within the robotic control system 146 controls the steering system 134 with low-level control and feedback, and may also supply power to the steering system 134.

Figure 1C:
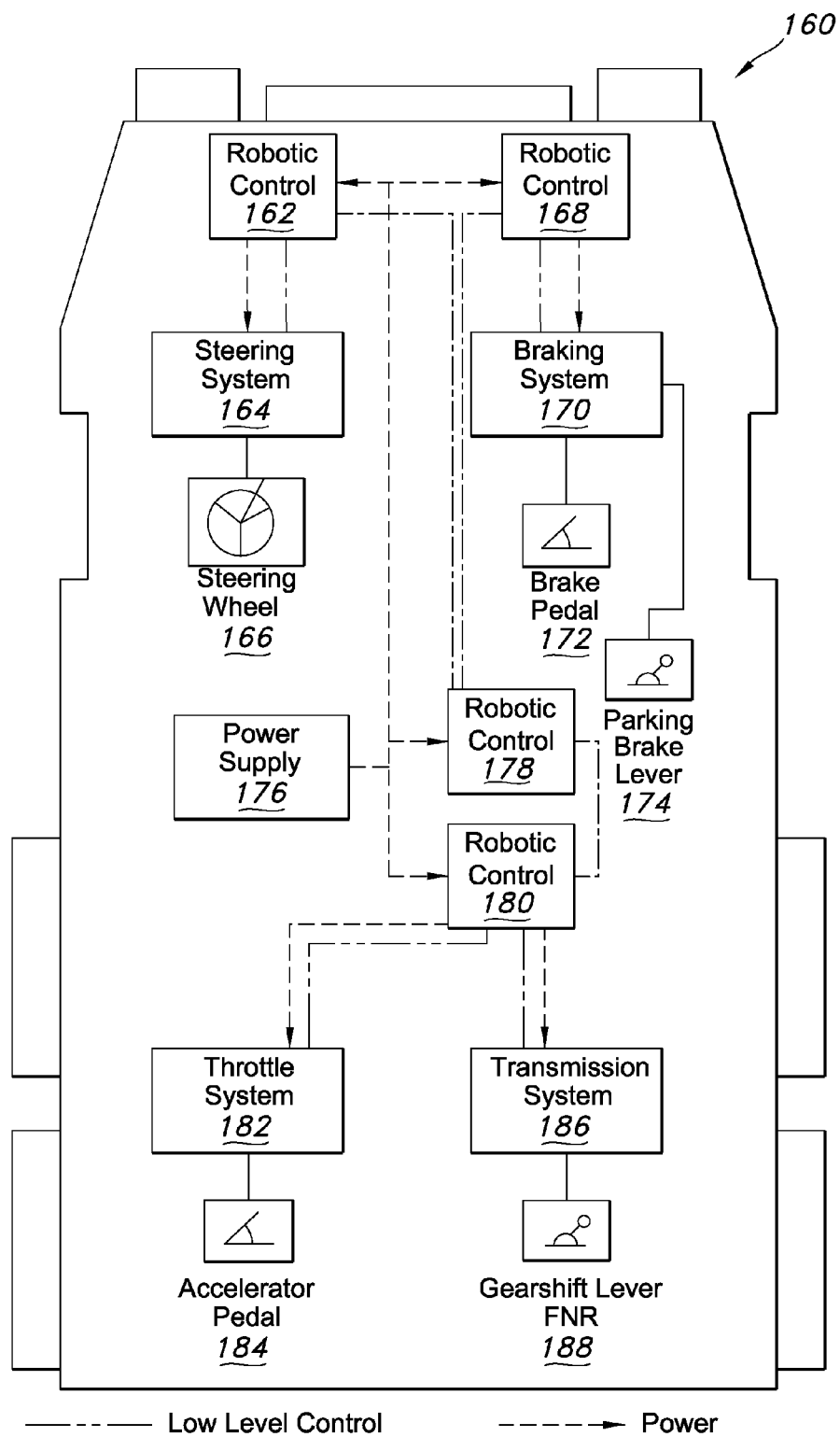

FIG. 1C shows yet another embodiment of a vehicle 160. In this embodiment, there are four RCUs 162, 168, 178, and 180 and no vehicle control units as in FIGS. 1A and 1B. RCU 162 controls the steering system 164, RCU 168 controls the braking system 170, and RCU 180 controls the throttle system 182 and the transmission system 186. The remaining RCU 178 may be a supervisory robotic control unit that connects and operates the other RCUs 162, 168, and 180. A power supply 176 delivers power to each RCU 162, 168, 178, and 180, which in turn delivers power to the corresponding system.

Figure 13C:
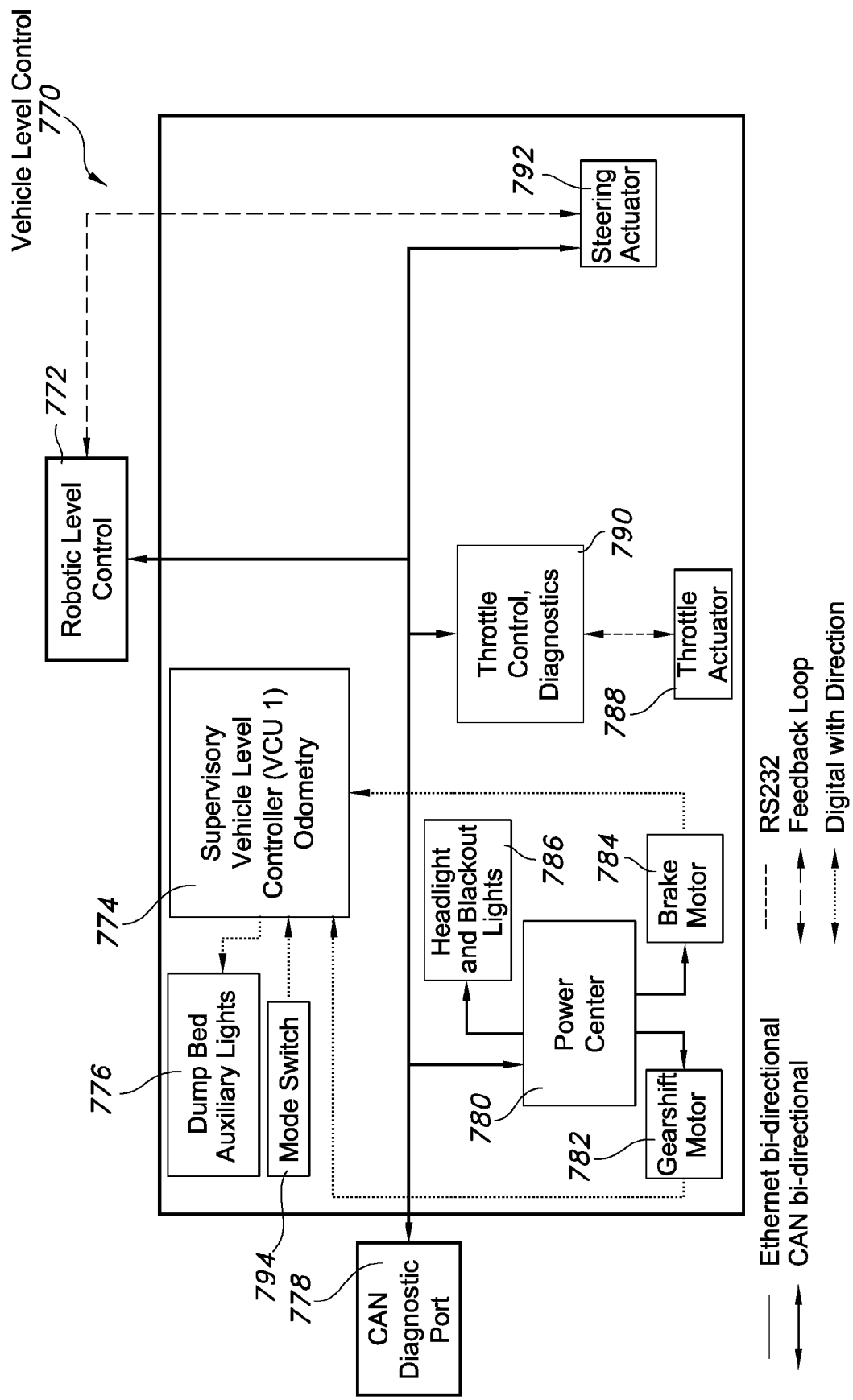

FIG. 13C shows another embodiment of the vehicle level control 770 where there is only a single VCU, the supervisory vehicle level controller (VCU #1) 774. In this embodiment, the steering actuator 792 receives CAN communication from the robotic level control 772, and also has a feedback loop with the robotic level control 772. The headlight and blackout lights 786 receive control signals from the power center 780, and the power center 780 supplies control signals to the gearshift motor 782 and the brake motor 784. There is a mode switch 794 that provides signals to the supervisory vehicle level controller (VCU #1) 774.

Figure 13D:
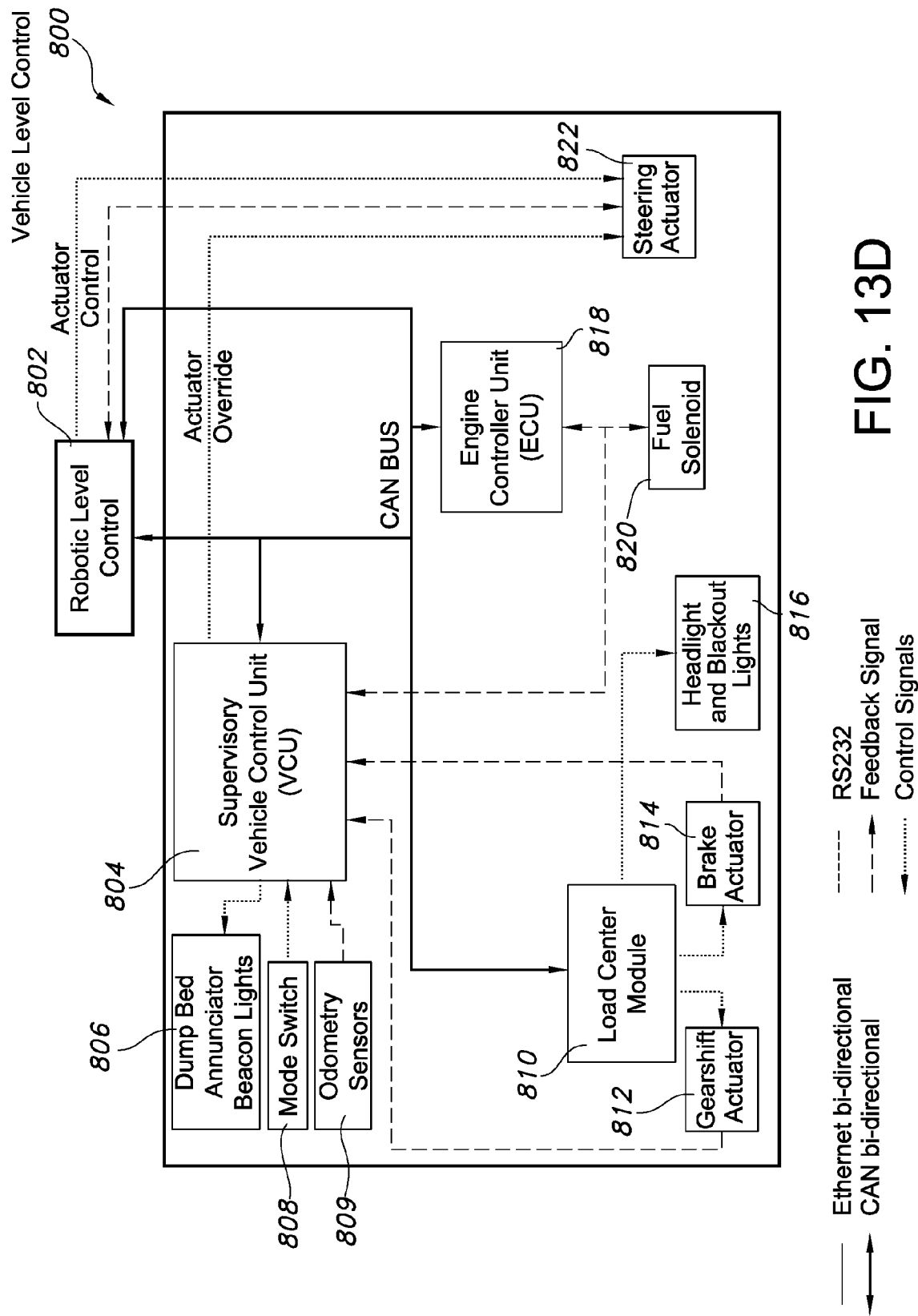

FIG. 13D shows another embodiment of the vehicle level control 800. In this embodiment, there is a supervisory vehicle control unit (VCU) 804 that corresponds to the supervisory vehicle level controller (VCU 1) in FIGS. 13B and 13C. The supervisory VCU 804 may send control signals, also called "digital with direction" in other embodiments, to the dump bed, annunciator, and beacon lights 806. The supervisory VCU 804 may receive control signals from the mode switch 808. The supervisory VCU 804 also receives feedback signals, also called "feedback loop" in other embodiments, from each of the odometry sensors 809, the gear shift actuator 812, the brake actuator 814, and the fuel solenoid 820. In the embodiment of FIG. 13D, there is a separate odometry sensor 809. Also, in other embodiments the gear shift actuator 812, brake actuator 814, and fuel solenoid 820 are referred to interchangeably as the gearshift motor, the brake motor, and the throttle actuator, respectfully. The vehicle level control 800 also has a load center module 810, called a "power center" in other embodiments. The load center module 810 is in CAN communication with the robotic level control 802, and further sends control signals to each of the gear shift actuator 812, the brake actuator 814, and the headlights/blackout lights 816. Finally, the vehicle level control 800 may have an engine controller unit, or ECU 818, called a "throttle control" in other embodiments. The ECU 818 is in CAN communication with the robotic level control 802, and controls the fuel solenoid 820 to deliver fuel to the engine.

In another embodiment shown in FIG. 14A-B, the RCUs 954, 944, do not have integrated Ethernet switches. Instead, there are separate Ethernet switches 970, 972, and 974 associated with each of the RCUs 954, 944, and 962. Thus, the embodiment shown in FIG. 14A still has an Ethernet network, but the Ethernet switches 970, 972, and 974 are external of the RCUs 954, 944, and 962. In the vehicle level control 902 shown in FIG. 14B, there is not a feedback loop between the steering actuator 928 and the robotic level control 904. Instead, the steering actuator 928 is controlled by a steering and dashboard (VCU #2) 922. In certain embodiments, the steering and dashboard (VCU #2) 922 has an integrated controller that controls the steering actuator 928. In other embodiments, however, the controller may be separate and detached from the steering and dashboard (VCU #2) 922. In one embodiment, a power amplifier 930 is associated with the steering and dashboard (VCU #2) 922.

In another embodiment shown in FIG. 15A-B illustrates alternative layouts of the various controllers and sensors in which robotic control modules perform functions associated with vehicle control units. For example, FIG. 15A shows a robotic level control A 1504 having the same layout as FIG. 13A, except the robotic level control A 1504 is in communication with a second robotic level control, such as robotic level control B 1502 and illustrated in FIG. 15B. Robotic level control B 1502 includes a low level controller 1514 that can receive commands from a supervisory RCU, such as supervisory RCU #1 1538, and control the vehicle dump bed and auxiliary lights 1516.

The robotic level control B 1502 may also include a gearshift motor RCU #5 1508 that can control a gearshift motor 1510 and communicate with the supervisory RCU #1 1538. The gearshift motor 1510 may be an actuator for the vehicle transmission. A brake motor RCU #6 1509 may be included that can control a brake motor 1512 that is an actuator for the vehicle brakes. A throttle RCU #7 1518 may be included to control the throttle actuator 1520. In other embodiments of the present invention, the robotic control system may include more or less RCUs that are adapted to control one, or sometimes more than one, component. For example, one RCU may be included to control both the gearshift motor 1510 and brake motor 1512.

Further variations of the layout embodiments of RCUs and VCUs within a vehicle, such as in FIGS. 13, 14, and 15, are contemplated by the inventors via different combinations of the elements by their interfaces—e.g., an element controlled by CAN and having feedback can be connected to either of an available RCU or VCU at either robotic or vehicle control level. Connections shown in the drawings as single Ethernet cables may be split into two or more cables to connect the network as generally described herein.

In one embodiment, the vehicle is equipped with an Obstacle Detection/Obstacle Avoidance (ODOA) system that is designed to detect obstacles external to the vehicle, and to initiate the proper control actions to avoid them. U.S. Provisional Patent Application No. 60/780,389, filed Mar. 8, 2006, and U.S. Ser. No. 11/584,097, entitled "Systems and Methods for Obstacle Avoidance", filed concurrently herewith, more fully describes an ODOA system, and it is incorporated herein by reference. In one such embodiment, the vehicle comprises the following components: (i) a forward nodding laser scanner assembly; (ii) range guard software; (iii) an obstacle map; and (iv) control software. The forward nodding laser scanner assembly gathers true 3-D data about obstacles in front of the vehicle and passes that data to onboard computers for processing. Certain embodiments can have a rear fixed laser scanner assembly. The rear fixed laser scanner assembly gathers 2-D data about obstacles behind the vehicle and passes that data to onboard computers for processing. The range guard software detects interruptions of obstacle data from the laser scanners and publishes substitute data that indicate that obstacles are close in every direction that can be seen ("half moons"). This prevents the vehicle from moving in a direction that has not been positively determined to be clear of obstacles by the onboard software. The obstacle map indicates the relative positions of obstacles with regard to the vehicle, and the control software determines the correct trajectory through the obstacle field, and properly commands the control system (steering, throttle, brake, shift) to achieve that trajectory.

For fully autonomous modes of operation, such as navigation to GPS waypoints, this system operates without modification. For normal tele-operation, this system is modified slightly to greatly reduce the amount of left or right turn that will be applied autonomously on top of the commanded tele-operation to avoid obstacles, but the autonomous braking for obstacle avoidance remains fully in effect. Thus, if a remote operator tries to deliberately steer straight at an obstacle in normal tele-operation mode, the system will bring the vehicle to a halt in front of the obstacle. (In fully autonomous mode, the system will steer the vehicle around the obstacle if there is a clear path.) In cases of, e.g., operational military necessity, the obstacle avoidance may be turned off all together by selecting an appropriate key on the operator control unit keyboard.

Embodiments of the present invention provide numerous advantages over vehicles able to operate only in an autonomous mode, and over vehicles that may be able to operate in both manual and autonomous modes. For instance, embodiments of the present invention allow a user to recover from an accident, such as the vehicle running into a ditch, or perform simple tasks or tasks requiring greater maneuverability, such as putting a vehicle in the garage, without complex programming. In addition, embodiments of the present invention can move in areas where electronics are not allowed. For instance, the sensors on an embodiment of the present invention can be disabled in areas where they may be sensed by enemy sensors.

Start Method

As discussed above, while there are several different operator controls or interface elements that may signify a state of being in readiness to enter autonomous mode, there are considerably less opportunities to take advantage of learned behaviors and training There are tangible benefits in safety, training costs, and operator confidence if the so-called user interface of a machine is designed ergonomically. Human interface design for entering autonomous mode can take many routes, e.g., messages, lights, sounds, keys and permissions, can all be used to guide the operator's behavior.

Because the claimed invention may be used in both autonomous and manual modes, it may be desired for the vehicle to enter autonomous mode from a standing start, and to have been placed into a safety configuration at the time of entering autonomous mode. In other words, the vehicle should be parked but should also be safely parked. At the same time, an operator can readily determine that the vehicle is ready to enter autonomous mode, e.g., by some externally visible flag, symbol, or sign, preferably visible from tens of feet away. Of course, there is a limited amount of dashboard and other space for interface elements, and certainly for symbols visible from relative distance. Accordingly, the symbol or sign would advantageously be adapted from one already available on the vehicle. In addition, the operator can "undo" autonomous mode in the reverse manner that it was entered.

The controls and interface elements and actions of a manual vehicle can be divided arbitrarily into sets, but there are only a few actions that are part of standard driver training for a safe parking routine. One is to place the vehicle into park (for an automatic transmission); another is to set the front wheels turned toward or away from a curb depending on uphill or downhill slope.

In one embodiment, setting the parking (or emergency) brake for entering into autonomous mode can offer combined functionality and human interface features that are advantageous. Setting the parking brake is part of a safe parking routine, and many parking brake levers are visible from a relative distance when set. Setting the parking brake is not necessarily useful, however, because in traditional vehicles the parking brakes prevent the vehicle from moving. Releasing the parking brake renders the vehicle free to move, but would not be suitable for embodiments of the invention because a released parking brake does not show an outside observer what mode the vehicle is in, and especially, whether it is ready to enter autonomous mode.

Figure 9:
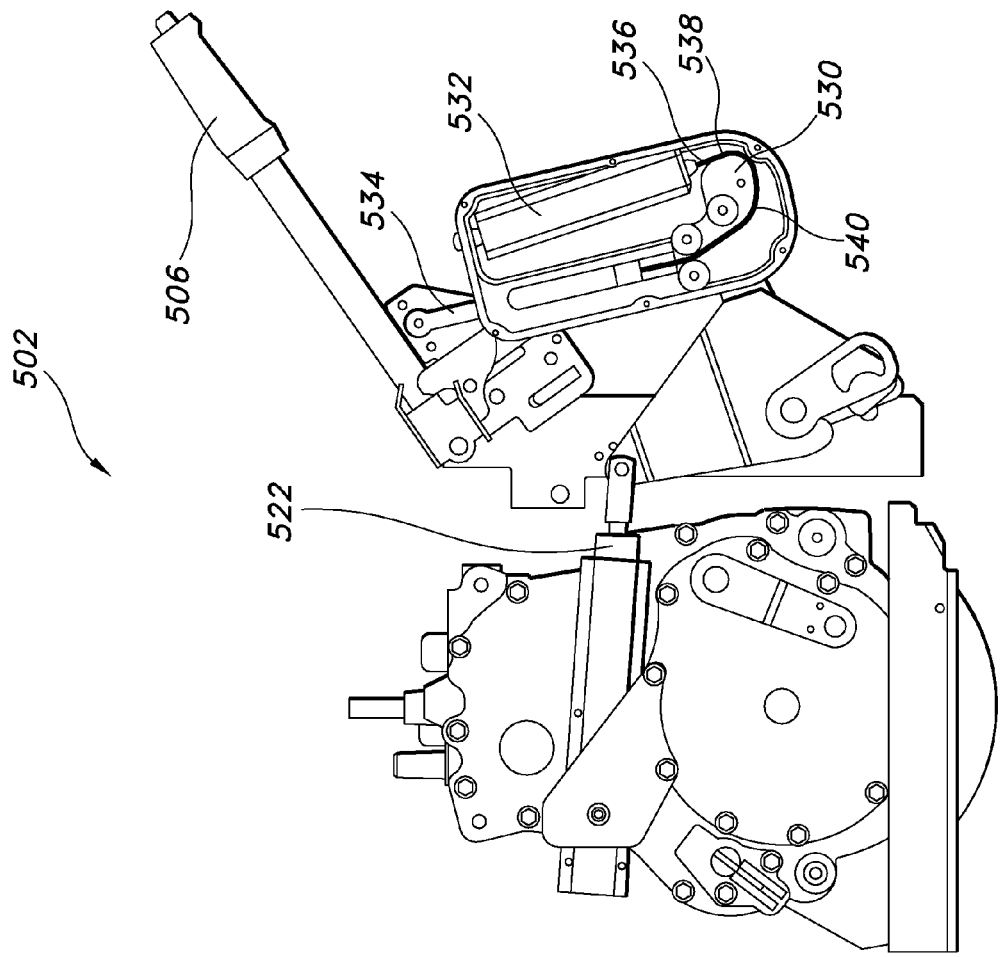
FIG. 9 is a diagram illustrating a partial side view of a braking system in one embodiment of the invention, where the system is engaged and in autonomous mode.
Figure 10:
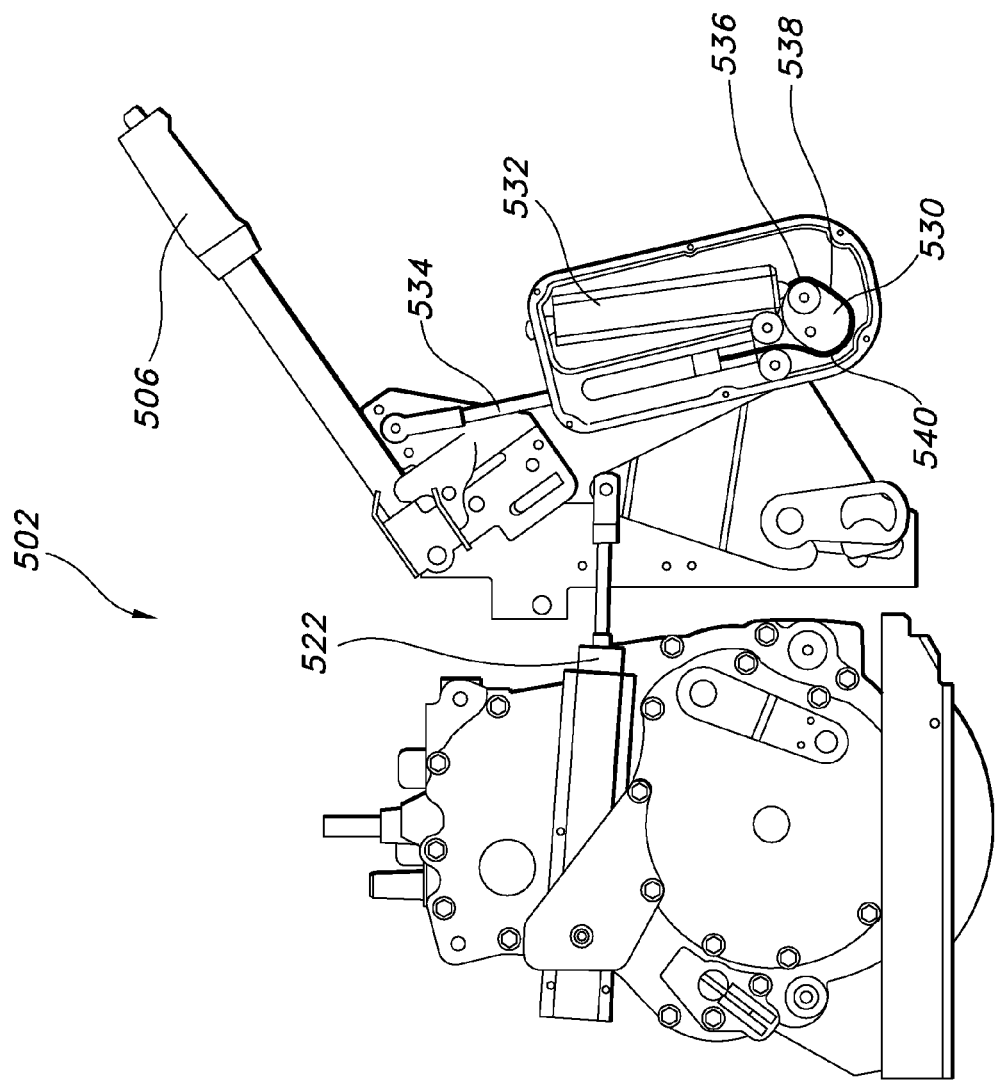
FIG. 10 is a diagram illustrating a partial side view of the braking system of FIG. 9, where the system is disengaged and in autonomous mode.

Accordingly, the embodiment illustrated in FIGS. 8-11 has an autonomous mode that cannot be entered unless the parking brake is set, and appears as set. In certain embodiments the parking brake is set by the parking brake lever 506. As autonomous mode begins, the parking brake lever 506 remains set to outward appearances, but has been overcome by autonomous control so that the vehicle 102 is free to move. For example, FIG. 9 shows the parking brake lever 506 engaged while the vehicle 102 is in autonomous mode. FIG. 10 shows the parking brake lever 506 disengaged while the vehicle 102 is still in autonomous mode. As can be seen from FIGS. 9 and 10, the parking brake lever 506 appears to be set whether the brake is actually engaged or not. One manner of accomplishing this is to internally relax or disengage the brake, and a particular mechanism and system for this is discussed herein. Another manner would be to counteract the parking brake along the cable or other connection to the braking system. In either case, however, there can be no instance in which the use of the parking brake causes safety risks beyond the ordinary use of the parking brake. Releasing the parking brake, as discussed herein, optionally causes an E-Stop, a controlled stop, or entry into manual mode—but the vehicle is no longer autonomous.

It would also be possible to set an automatic transmission to "Park" as another action associated with safe parking, but this does not offer all of the advantages of the parking brake routine, and particularly of the use of the parking brake lever. For example, the position of a gearshift lever is not readily determined outside the vehicle; and a mechanism for internally releasing an automatic transmission while still leaving it showing "Park" would be complex and expensive. Even automatic transmission vehicles have parking brakes, so it is preferable to establish the parking brake routine across all autonomous vehicles likely to be used by an operator.

As such, one aspect of the present invention is a vehicle that includes an autonomous mode starting system and method. First, the vehicle includes, and permits and operator to set, a parking control element that is set in a predetermined setting when the vehicle is parked. This predetermined setting should be commonly perceived as signifying disabling movement, e.g., should be part of the ordinary rules of the road and/or ordinary driver training Optionally, this parking control element is visible from outside the vehicle, and/or other indicia are made visible from outside the vehicle. The vehicle's control system interprets the predetermined setting as permitting autonomous mode. A disengaging mechanism responsive to the control system disengages the mechanism preventing autonomous movement, yet leaves the parking control element in the predetermined setting. In other words, the parking control element should continue in a position that signifies disabled movement. Optionally, the disengaging mechanism is electrical, and would be deactivated under E-Stop or power loss conditions, permitting the disengaging mechanism to reengage. Should an operator move the parking control element from the predetermined position, the control system could engage manual mode and/or deactivate autonomous modes.

Thus, the internally disengageable parking control or brake has two aspects, mechanically and functionally distinct. First, to start the vehicle in autonomous mode, the parking control is moved to a position signifying a safety-parking configuration to ordinary observers. When the autonomous mode is started, the parking control internally disengages from the braking systems, permitting movement. It is optional, but advantageous, to leave the parking control electrically disengaged but mechanically "charged" (i.e., mechanically biased to reengage upon the removal of electrical control) and/or further in the position signifying a safe parking configuration. If the parking control remains in the position signifying a safe parking configuration, this can signify readiness for autonomous mode or safe autonomous operation. If the parking control is electrically disengaged but remains mechanically charged, it can be reengaged under electrical control or can fail-safe to a braking condition when electrical power is lost. This is optional because, although it is practically necessary to have at least means of fail-safe braking on the autonomous vehicle, such fail-safe braking can be other than the parking controls.

Safety Stop System

Figure 12:
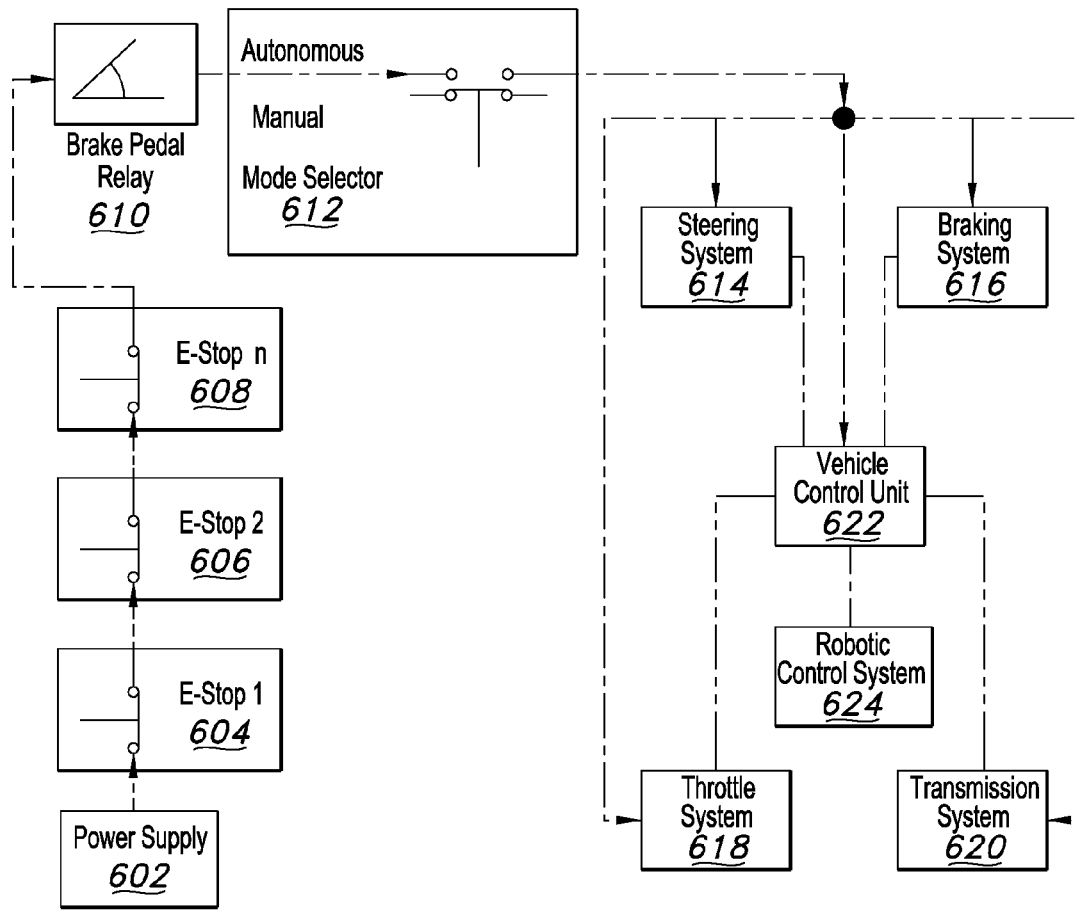
FIG. 12 is a block diagram illustrating an E-Stop implementation in one embodiment of the invention.

Another embodiment of the claimed invention contains a safety stop system as illustrated in FIG. 12. As used herein, "safety stop system" includes an E-Stop subsystem, a controlled stop subsystem, and a system for changing from manual to autonomous modes. It is a feature of the present invention that the E-Stop system and the controlled stop system share certain components, and further that the system for changing from manual to autonomous operation uses some of these components herein.

An E-Stop, or emergency stop, is a mechanical and electrical implementation configured to disengage the "hazardous" systems of a vehicle. Autonomous vehicles and E-Stops are subject to various International Standards Organization (ISO) standards among them IEC/EN 60947, IEC 60204-1 and/or ISO/IEC 13850. For example, IEC 60204-1, entitled "Safety of Machinery," states that (i) the E-Stop override all vehicle functions in all modes, (ii) power to the machine actuators that can cause a hazardous condition(s) shall be removed as quickly as possible without creating other hazards (e.g., by the provision of mechanical means of stopping requiring no external power); and (iii) a reset shall not initiate a restart. The standards require no "electronic" components in the E-Stop system, no single point of failure, and to remove power to all moving parts. A control or controlled stop, in contrast, utilizes software to disable some or all of the autonomous control systems. It is a feature of the present invention that the E-Stop system and the controlled stop system share certain components, and further that the system for changing from manual to autonomous operation uses some of these components herein.

A second network of switches, relays, clutches, and/or standard E-stop "mushroom" buttons may be provided in a drive-by-wire system, and this second network is connected by its own set of wiring and connections. This necessary facility is most often implemented in a manner that significantly decreases available space and increases cost and complexity. On the other hand, drive-by-wire electrical networks are more easily "E-stopped" than a system of mechanical actuators, which is another reason why vehicles intended for only autonomous use typically are drive-by-wire.

The E-Stop implementation in the embodiment shown in FIG. 12 is a subsystem of the safety stop system designed to rapidly bring the vehicle to a quiescent state any time one of the several E-Stop buttons provided on the vehicle is pressed, or anytime the safety stop system is activated by other means (see below). For example, while a controlled stop may be initiated by radio an E-Stop provides a human actuated means to remove all potentially harmful sources of energy. In one embodiment of the present invention, activating the E-Stop subsystem has no effect on the operations of the vehicle when operated in manual mode. Although manually operated vehicles are "machines," typically they are not E-stopped (although tools, manipulators, and other machinery borne by the vehicle may be E-stopped). Alternatively, the E-stop subsystem may also stop the vehicle in manual mode.

In one embodiment of the present invention, the E-Stop implementation comprises several "E-Stop" switches mounted at various locations on the vehicle. These E-Stop switches are in the form of "big red buttons" (mushroom buttons), which may illuminate when pressed and an E-Stop is triggered. In one embodiment, a Gator™ model vehicle manufactured by Deere & Company of Moline, Ill. configured with the present invention comprises four E-Stop buttons, mounted on the left front of the litter rack, the right front of the litter rack, the dashboard in front of the passenger's seat, and on the rear laser scanner sun shield (farthest aft on the vehicle).

These switches are configured as a serial string, and additional E-Stop switches can be easily added by lengthening the serial string of switches. The manner of lengthening the serial string of switches is a serial plug connector provided on each E-stop button. For example, when this system is applied to a vehicle longer, or wider, or having different operator locations (e.g., in comparison to a Gator™ model vehicle discussed above), a cabled E-stop button, having its own connector, is strung to each new E-stop position. An E-stop button under this system may have two plug connectors, or an attached cable and one connector. Additional E-stops are added in the same manner. Accordingly, this manner of arranging E-stops provides a simple reconfigurable way of applying the present safety systems to a vehicle of any size or configuration.

In the embodiment shown in FIG. 12, a power supply 602 provides power to the autonomous systems of a vehicle. Attached to the power supply 602 is a series of push button break/relays, E-Stop (1) 604, E-Stop (2) 606, and E-Stop (n) 608. If any of the E-Stops 604, 606, or 608 are pressed, power to the autonomous system is disabled. If the vehicle 102 is moving under autonomous control, the vehicle 102 will stop. Embodiments of the present invention allow the addition or removal of E-Stop buttons. This allows the customer to configure the number and placement of E-Stop buttons.

FIG. 12 depicts a scenario in which all of the autonomous systems are E-stopped. However, in an alternative system, for the purposes of the safety stop system, the autonomous systems includes robotic control systems that are connected to moving parts or that cause the vehicle 102 to move (e.g., all of the operation systems of the vehicle 102, such as steering 104, braking 106, throttle 108, and transmission 110, as well as any moving sensors or moving actuators), as well as robotic control systems that are not connected to moving parts (e.g., a supervisory control system, the "brains" of the robotic vehicle 102, or robotic control systems that are connected to passive sensors which do not move such as cameras or scanning devices). In such a case, FIG. 12 would not connect the robotic control system 624 to the E-stop subsystem. A supervisory robotic control system (such as that in FIG. 13A, Supervisory Robotic Level Controller (RCU #1) 738), would not be connected to the E-Stop subsystem, and would continue to monitor the vehicle systems that report to it, as well as sensors, etc. In FIG. 13A, rear perception robotic control module (RCU #3) 744 would also not be E-Stopped, because it is not connected to any moving actuators, nor does it control vehicle 102 movement (it is connected to radios 746, 748 and to rear laser scanner 752). In this configuration, the robotic vehicle 102 may be monitored by communication channels independent of the E-stop system, may collect data regarding its surroundings via non-moving sensors, and may monitor and diagnose various conditions, including the E-Stop that just occurred.

Returning to FIG. 12, these E-Stop relays 604-608 control the power to the engine controller and to the motors and actuators associated with vehicle systems having motion. They are a part of a serial string with E-Stop switches, and when any E-Stop switch is pressed the serial string opens, removing power from all the E-Stop relays. When power to the engine control is removed, an engine fuel shutoff solenoid valve closes and removes fuel from the engine causing it to shut down. In one embodiment, the motors and actuators powered through E-Stop relays include: a steering motor, a nodding motor for the forward laser scanner, a shift actuator, and a brake actuator. When power is removed from these motors and actuators their motion stops. The steering clutch may also be controlled by an E-Stop relay.

Also attached in series with the push button break/relays 604-608 is a brake pedal relay 610. The brake pedal relay 610 senses the depression of the brake pedal (not shown). If the brake pedal is depressed, power to the autonomous system is disabled. Note that it is a feature of the invention that the brake pedal may trigger a standards-level E-Stop, E-Stop equivalent (missing only the big red button), or controlled stop in autonomous mode.

The embodiment shown also comprises a mode selector 612. The mode selector 612 allows a user to select a manual or autonomous mode. Like the relays shown in FIG. 12, selection of the manual mode causes power to the autonomous system to be disabled. In one embodiment, the mode selector 612 is used to reset the system after an E-Stop has been triggered and then cleared, by pressing the Autonomous side of the switch.

The vehicle 102 of the embodiment shown comprises several operational systems as described above. The operational systems comprise the steering system 614, braking system 616, throttle system 618, and transmission system 620. The operational systems work under the control of a vehicle control unit 622. In autonomous mode, the vehicle control unit 622 receives instructions from a robotic control system 624.

In one embodiment, a controlled stop is triggered by normal manual operation of the vehicle, such as application of the foot brake, throttle, or steering wheel. In another embodiment, the electrical system is configured so that when the controlled stop system is activated it only shuts off power to the autonomous control actuators (as discussed above). This way, the computers and sensors associated with the robotic control system still have power and are able to function.

As a whole, the safety stop system is a combination of the E-Stop subsystem, the controlled stop subsystem, and the autonomous-to-manual changeover subsystem. If the E-Stop subsystem is formally compliant with standards it should be mechanically actuated, lack electronics, require a reset operation, not restart the vehicle if reset, and meet other constraints as previously discussed. For this purpose, the E-Stop subsystem includes four "normally disengaged electrical clutches" (disengaged when not powered), that is, four electromagnetic clutches 216, 306, 406, and 508. As a clutch is defined as a device for engaging and disengaging, "normally disengaged electrical clutches" includes switches, pins, relays, etc., which engage and disengage, but are disengaged when not powered (they may also lock in a disengaged state upon becoming not powered). The clutches are mechanically deprived of power by an open circuit when the E-Stop buttons are pressed. The parking brake lever 506 is optionally outfitted with a mechanical switch that creates an open circuit when the parking brake is released.

These same clutches, however, are also used for three main kinds of controlled stops that are not E-stops.

First, a mechanically actuated controlled stop may be initiated that is not an E-stop, by creating an open circuit (e.g., by holding a "momentary-off" button or disengaging a normally closed button switch) to the clutches. This could be treated by the control units 622, 624 in FIG. 12 as equivalent to an E-stop (if the initiating mechanical switches are not monitored) or other than an E-Stop if the initiating switches are monitored. This could be a controlled or emergency stop, but not a standards-level E-Stop, for example, because it does not use a readily recognized "big red button," or because it would not necessarily require a reset to reenter autonomous mode, or because some moving parts (e.g., moving sensors such as a sweeping scanner) could be left on.

Second, an electrically actuated controlled stop could be initiated by the electrical, non-software system by a circuit that interrupts power to the clutches via a relay or the like. This could occur for any low-level reason determined to be hazardous, e.g., overheating, over voltage, etc. This would be a controlled or emergency stop, but not a standards-level E-Stop for the same reasons as discussed above. Lastly, a stop could be initiated by software and control, for any of many reasons. For example, a controlled stop could be initiated by a remote operator by radio or upon detection of a very close moving object, etc. This would also be a controlled or emergency stop, but not a standards-level E-Stop for the same reasons as discussed above. To the extent that it is impossible to chase down a moving vehicle to press a "big red button," a fourth category, the "remote E-Stop," also would exist. In such a case, the robotic control 622, 624 in FIG. 12 permits operation only so long as the remote "big red button" on the remote unit or OCU is actively sensed, communicated, and verified as "not pressed," otherwise an E-Stop equivalent, using the clutches, is initiated and/or not prevented from occurring.

These controlled stop systems could use engaging/disengaging mechanisms or clutches that are not part of the E-Stop subsystems. However, it is a feature of the present invention that the controlled stops can employ one or more of the E-Stop "normally disengaged electrical clutches," which are all be disengaged for an E-Stop to occur.

These same clutches can also be used to engage and disengage manual and different autonomous operation control modes, including tele-operation modes. In this sense, there can be a control difference between different autonomous modes. In fully autonomous mode, all of steering, braking, throttle, forward/reverse would require engaged clutches. A cruise control mode could engage only braking and throttle, leaving steering to the operator. Another mode could engage only steering, leaving braking and throttle to the operator (following a patrol route at the operator's preferred speed). Of course, fully manual mode would disengage all the clutches—but would not need to shut down any other autonomous systems at all.

As such, one aspect of the present invention is a vehicle 102 that includes a safety stop system including an E-Stop subsystem (shown in FIG. 12) that removes power from all moving parts and from all parts that cause the vehicle to move. The safety stop system enhances safety in all modes and efficiently overlaps and combines components of autonomous control systems, manual mechanical control systems, and safety systems. For the parts that cause the vehicle to move, the E-Stop subsystem includes a normally disengaged electrical clutch for each such system, and powers down all of them in an E-Stop. The safety stop system also includes a controlled stop subsystem that stops the vehicle by removing power from selected ones of the normally disengaged electrical clutches, while leaving other selected moving parts active. Optionally, a mode changeover switch 612 for switching between manual mode and autonomous modes, or between autonomous modes, also removes power from selected ones of the normally disengaged electrical clutches, which may or may not stop the vehicle, and may also leave all of the remaining powered moving parts active. An E-Stop could be initiated after a controlled stop, shutting down remaining moving parts.

The vehicle in manual mode thereby provides an enhanced level of safety as it would be in a non-autonomous, unmodified configuration. In autonomous or tele-operated modes with or without passengers, the vehicle includes E-Stop systems that will expediently bring it to a rolling stop. Portions of these E-Stop systems, however, are adapted for use in controlled stop situations, reducing cost, complexity, and the number of actuators necessary for both functionalities, and increasing the reliability of the controlled stop subsystem. Further, these subsystems are again used for ordinary autonomous to manual switchover, which may or may not involve stopping or activation of moving parts.

Robotics Safety System

An embodiment of the present invention may also incorporate a Robotics Safety System whose function is to govern the interaction between the onboard robotics and onboard personnel. Personnel may be onboard a vehicle when it is operated in autonomous mode, and may need to take control of the vehicle when called for by human judgment. An example of this could be in a medical evacuation scenario where wounded personnel are being cared for by an onboard medic, with the vehicle driving autonomously to a helicopter-landing zone (LZ) for pick-up. Should the condition of one of the wounded become more critical, the medic could call for a closer, alternate LZ, and take manual control to get the vehicle to its new destination.

The actions that onboard personnel take to control the vehicle in such embodiments when transitioning out of autonomous mode need to be simple and naturally understandable. Examples of such actions include braking with the brake pedal, steering with the steering wheel, shifting with the shift lever, accelerating with the throttle pedal, and setting and releasing the parking brake with the parking brake lever. When the onboard robotics interacts with an onboard person, the initial reaction of the robotics first accounts for the safety of the person, and then allows the onboard person to take whatever action they judge best (human judgment takes precedence over programmed robotic reaction once safety is accounted for). In addition, an embodiment of the present invention may provide onboard personnel and bystanders with an obvious indication that the system is operating in autonomous mode.

One embodiment of the present invention, for example the embodiment illustrated in FIG. 8, comprises a Robotics Safety System comprising the following components: (i) electromagnetic clutches 508 between the operational systems and actuators 522, also discussed above as the safety stop system; (ii) a mechanical parking brake reversal mechanism; (iii) an autonomous/manual switch (mode selector) 510 on the dashboard; and (iv) a warning beacon and audio enunciator (beeper).

When such a system is operated in autonomous mode, electromagnetic clutches in the brake actuator and the shift actuator, and with the steering motor, engage to allow the onboard robotics to control the path of the vehicle. When the vehicle is placed into manual mode, or when an E-Stop or controlled stop is triggered, these clutches are de-energized and release, removing all robotic resistance to manual operation of these controls. This way, the vehicle responds in manual mode, as an operator would expect it to.

The embodiment is also designed such that the parking brake is set before the system operates in autonomous mode. The mechanical parking brake reversal mechanism allows the brake actuator to function by overcoming the parking brake when the onboard robotics commands "brakes release," and to allow the parking brake to set the brakes when the onboard robotics commands "brakes set". Thus, if a power failure in the onboard robotics occurs and the brake actuator loses power, the parking brake will set the brakes through purely mechanical action, putting the vehicle into a safety state. Power failure to the brake actuator can occur as a result of a system malfunction, of an E-Stop or controlled being triggered, or of the system being placed into manual mode of operation.

In the present system, the use of the parking brake has different benefits in this regard. First, the parking brake is set mechanically, and then internally relaxed by electrical actuators. This means that the parking brake will, in fact, re-engage when not powered. Second, the parking brake can be set to re-engage gently, i.e., with less than full braking force, to initiate a controlled mechanical rapid coast-to-stop, which is consistent with E-Stop standards. However, an E-Stop or controlled stop according to certain embodiments of the invention does not necessarily cause brakes to engage (for example, absent the parking brake system discussed herein, brakes are normally configured to engage when powered, not when not powered). The parking brake envisioned is a normally disengaged system that is engaged mechanically, and then internally relaxed electrically. In contrast, a normally engaged "default brake" could be used, which engages unless electrically powered. In a system powered by an electrical motor, the motor itself could slow the vehicle.

If the vehicle is being operated in autonomous mode, and is then placed in manual mode using the dashboard switch, the system will configure itself exactly as if autonomous mode had not been commanded: power is removed from the actuators, motors, and electromagnetic clutches (although not from the engine if it is already running), which frees the steering, shift, and brake to be actuated by an onboard person without interference from the robotics. In addition, since the parking brake is set in order to operate in autonomous mode, the brakes will come on (if they were not already) through the action of the mechanical parking brake reversal mechanism. Then, if the onboard person wishes to drive the vehicle manually, it is a natural reaction to release the parking brake by lowering the parking brake lever between the seats.

The vehicle in such an embodiment is also equipped with magnetically mounted amber rotating warning beacons, mounted on the forward and aft laser scanner sun shields. The amber warning beacons operate whenever the vehicle is operated in autonomous mode, and can be easily reconfigured. The vehicle may also be equipped with an audio enunciator (beeper), which sounds whenever the engine is commanded to start autonomously, and is silenced after a successful autonomous engine start.

Accordingly, a robotics safety system is provided for a vehicle that is capable of carrying on-board personnel, i.e., passengers. Passengers include persons who may become the driver; when the vehicle is autonomous, everyone is a passenger. The vehicle has a set of manual operation members, such as levers and steering wheels, that are accessible to the passengers. The manual operation members are preferably the same operation members used to pilot the vehicle. When a passenger moves any of the manual operation members, the robotics safety system first enters a safety mode. Preferably, this mode includes bringing the vehicle to a controlled stop with the engine running (which is distinct from an E-Stop at least in that the engine remains on). Following the safety mode, the robotics control system permits a pilot or driver to assert control of the vehicle by the same manual operation modes that were used to initiate the safety mode. Further, the robotic control system can be controlled according to a set of detections that are classified as indicative of the exercise of human judgment, and responses to these detections can be given higher priority in behavior arbitration or action precedence than any programmed robotic reaction.

The robotics safety system is applied to a set of mechanical linkages for actuating operation systems, for example the braking system 502 in FIG. 8, directly from the control members. The robotics safety system includes normally disengaged electrical clutches 508 incorporated in each mechanical linkage. In an autonomous mode, the electrical clutches 508 are electrically engaged, permitting robotic control of the vehicle. Upon the initiation of any safety stop, the clutches 508 are electrically deactivated, removing resistance of the electrical clutches 508 to manual operation. Safety stops include E-Stops, as illustrated in FIG. 12, which stop all moving parts without electronics (via open circuits); remote or automatic E-Stop equivalents, which may reproduce the same effects but using electronics or software as an initiator; and controlled stops and safety stops, which may leave the engine running and/or moving (e.g., scanning) sensors active.

However, depending on the mission or application, the safety mode may be different. In a hostile environment, "safety" may require that the vehicle not be stopped—in this instance, the robotic control system may combine a transition mode requiring verification that a human is in control, and/or in which robotic control system monitors whether the vehicle is under responsive control by an operator (by algorithm and sensor, e.g., sensing an operator in the drivers seat and human patterns of control). In a training situation, "safety" may require engine shutdown Optionally, a robotics safety system as discussed herein includes at least one mechanically charged safety system, which is mechanically biased in a direction to suppress movement of a movable system such as an actuator, scanner, or the vehicle itself. This mechanically charged safety system permits movement of its movable system when an electrical relaxing mechanism is activated by robotics control, overcoming or relaxing the biasing force enough to permit movement. When electrical power is removed for any reason, the mechanically charged safety system engages, eventually or immediately stopping the movement to be suppressed. Preferably, this system is provided as an integral part of the parking brake system, which is one that is normally and naturally placed into a mechanically charged state by an operator.

A robotics safety system may include a manually operable member, such as a rocker switch or other switch, available to passengers in the robotically controlled vehicle. The manually operable member is monitored by the robotics control system, and has autonomous and manual settings. In the manual setting, the robotic control system removes its control over any actuators necessary for driving the vehicle, including over the mechanically charged safety system. The mechanically charged safety system then engages, stopping its associated moving system. If the mechanically charged safety system is a parking brake, the charged state is released using the parking brake lever. This is the same action that is normally used to permit the vehicle to move forward, i.e., the manually operable member, when operated to engage manual mode, initiates a series of actions that place the vehicle in a parked state with the parking brake set (although the engine may remain running).

When the manually operable member is set in an autonomous setting, the vehicle will only be permitted to enter autonomous mode when the mechanically charged safety system is engaged. Preferably, the mechanically charged safety system is engaged by using a second manually operable member, such as the parking brake lever.

The various vehicle operation systems 104-110 (Braking, Throttle, Steering, Transmission) are described in detail below. These are exemplary and non-exclusive. In a vehicle or platform according to certain embodiments of the invention, there can be different vehicle operation systems, or vehicle operation systems of the same type.

Braking System

FIG. 8 is a combination block and flow diagram illustrating a braking system 502 in one embodiment of the present invention. The braking system 502 shown in FIG. 8 supports a manual braking mode utilizing either the brake pedal 504 or parking brake lever 506. In FIG. 8, the manual mode is referred to as "normal operation," although in some embodiments, normal operation may refer to an autonomous or semi-autonomous mode of operation. In the manual mode, the electromagnetic clutch 508 is disengaged; no power is supplied to it. Also, the mode selector 510 is set to manual mode. The mode selector 510 may comprise a switch on the vehicle's dashboard or a menu option on a screen available to the user.

If the electromagnetic clutch 508 is disengaged (power off) or the mode selector 510 is set to manual (decision 512), then pulling or setting the parking brake lever 506 (decision 514) results in application of the brakes 516. If the electromagnetic clutch 508 is disengaged (power off) or the mode selector 510 is set to manual (decision 512), then depressing the brake pedal 504 also results in application of the brakes 516.

The braking system 502 shown in FIG. 8 also supports an autonomous braking mode. In the embodiment shown, the autonomous braking mode is only enabled when the parking brake lever 506 is set. In other embodiments, other means of enabling the autonomous mode may be implemented.

A power supply 518 provides power to the electromagnetic clutch 508, which is engaged to enable the autonomous mode. The power supply 518 also provides power to a controller 520. The controller 520 receives input from a robotic control system (not shown) or other inputs and uses those inputs to generate actuator signals, which the controller 520 provides to an actuator and potentiometer 522. In one embodiment, the actuator is a linear actuator, and the potentiometer is a linear potentiometer that provides a signal indicating the position of the linear actuator. The actuator and potentiometer cause the brakes 516 to be applied in autonomous mode when the electromagnetic clutch 508 is engaged and the mode selector 510 is set to autonomous mode (decision 512) and the emergency brake lever 506 is set (decision 514).

In such an embodiment, requiring the parking brake to be set acts as a safety feature, because if the electronics fail, the brakes 516 will be re-engaged. In one such embodiment, a cam unit acts as a variable force link between the parking brake lever 506 and the brake rod itself. The cam unit allows the autonomous system to disengage the brakes 516 (while the parking brake lever 506 still remains in the set position) with much smaller actuators. The cam unit also acts as a passive safety device—when power is disabled, the brakes 516 are engaged.

Another embodiment comprises an autonomous vehicle 102 including a mechanical braking system 502 capable of receiving manual inputs to operate the mechanical braking system 502 in a manual mode, wherein the mechanical braking system 502 comprises a parking brake 504 or 506; a controller 520 capable of generating autonomous control signals when the parking brake 504 or 506 is activated; and at least one actuator 522 configured to receive the autonomous control signals to operate the mechanical braking control system 502 in an autonomous mode, wherein the controller 520 is configured to send a mode switch signal to disengage the actuator 522 from the mechanical braking system 502 and engage the parking brake 504 or 506 so that the vehicle operates in manual mode.

Thus, the internally disengageable parking control or brake has two aspects, mechanically and functionally distinct. First, to start the vehicle in autonomous mode, the parking control is moved to a position signifying a safety-parking configuration to ordinary observers. When the autonomous mode is started, the parking control internally disengages from the braking systems, permitting movement. For example, in both FIGS. 9 and 10 the parking brake lever 506 appears to be set, but the parking brake is only engaged in FIG. 9. It is optional, but advantageous, to leave the parking control electrically disengaged but mechanically "charged" (i.e., mechanically biased to reengage upon the removal of electrical control) and/or further in the position signifying a safety-parking configuration. If the parking control remains in the position signifying a safety-parking configuration, this can signify readiness for autonomous mode or operation. If the parking control is electrically disengaged but remains mechanically charged, it can be reengaged under electrical control or can fail-safe to a braking condition when electrical power is lost. This is optional because, although it is practically necessary to have a way of fail-safe braking on the autonomous vehicle, such fail-safe braking can be other than the parking controls.

Figure 11:
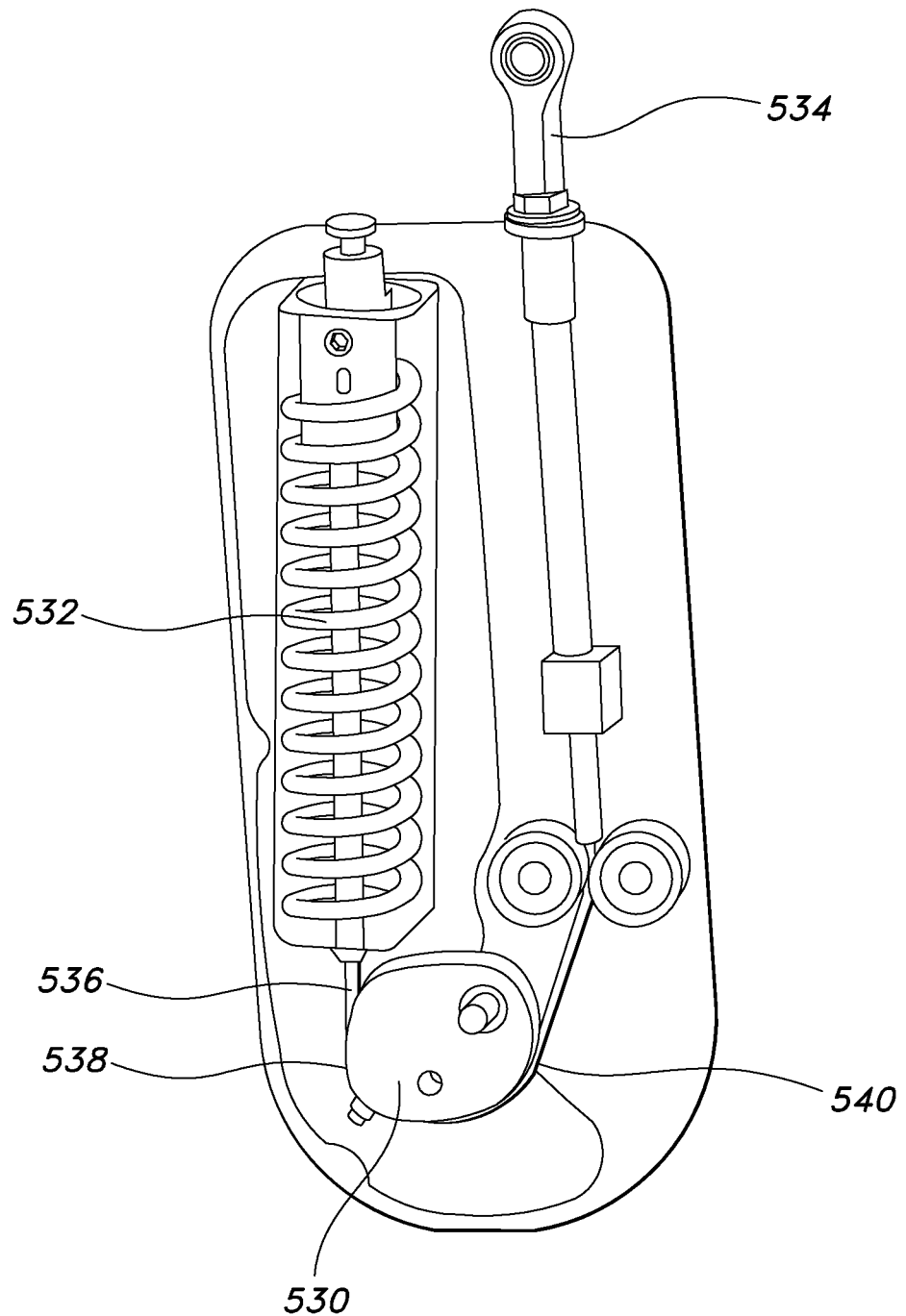
FIG. 11 is a diagram illustrating a partial side view of the braking systems shown in FIGS. 9 and 10.

As shown in FIGS. 9-11, braking systems 502 of certain embodiments may include mechanical resistance such as a cam 530, compression spring 532, output rod 534, and cable 536. The exact amount of force required to overcome this mechanical resistance can be tuned, which permits a low power actuator 502 to disengage the parking brake 516. The mechanism works by connecting a compression spring 532 in series with a cam 530 and an output rod 534 using a cable 536. The cam 530 acts as a force multiplier between the compression spring 532 and the output rod 534. As the spring 532 is compressed, the force on the spring side of the cable 536 naturally increases linearly proportional to the amount of compression by the spring constant. The eccentric cam 530 then reacts to this force output by the spring 532 as two distinct profiles, the input profile 538 and the output profile 540. The ratio of the radii of the two profiles 538, 540 of the cam 530 determines the force multiplication, up or down, between the spring force side of the cable 536 and the output rod force side of the cable 536, and the profiles 538, 540 on the eccentric cam 530 set the ratio of these radii at a given location of the cam 530. By putting the cam 530 in series with the spring 532, we can effectively set any output spring rate desired, even rates with negative slopes.

Creating a mechanical system that acts like a spring with a non constant, possibly even negative, spring rate permits much smaller actuators 522 to counteract a built-in force bias that works with an engaging mechanism may require a larger force to oppose the engaging mechanism to facilitate a return to home position in the case of power loss.

Throttle System

Figure 7:
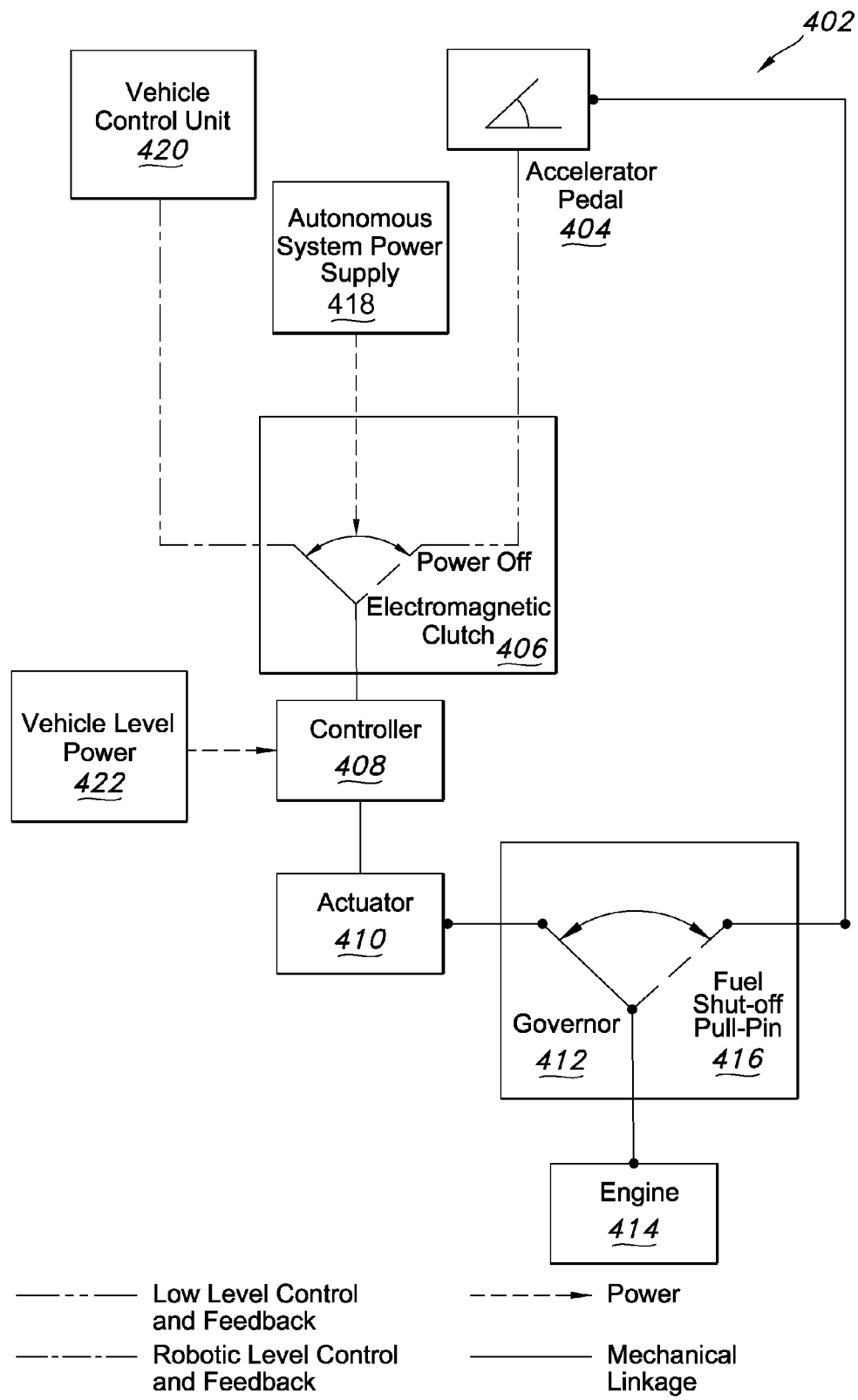
FIG. 7 is a block diagram illustrating a throttle system in one embodiment of the invention.

FIG. 7 is a block diagram illustrating a throttle system 402 in one embodiment of the present invention. The throttle system 402 may operate in three different modes: manual electronic, manual non-electronic, and autonomous. When the power to the autonomous throttle system 402 is off, the electromagnetic clutch 406 is disengaged, and a manual electronic mode of throttle operation is enabled. In the manual electronic mode, movement of the accelerator pedal 404 results in a signal being sent to a controller 408. The controller 408 generates an actuator signal based on the accelerator pedal 404 position and sends the actuator signal to an actuator 410. The actuator 410 controls a governor 412, which meters the amount of fuel delivered to the engine 414. In one embodiment, there is no separate governor 412, and the actuator 410 itself meters the amount of fuel delivered to the engine 414. Thus, in the manual electronic mode, changes in the position of the accelerator pedal 404 result in changes in fuel flow to the engine 414.

The throttle system 402 shown in FIG. 7 also supports a non-electronic manual mode. To engage the non-electronic manual mode, the user pulls a fuel shut-off pull pin 416. This configuration change disengages the governor 412, which may be embodied as a variable solenoid used to control the throttle and engage a mechanical governor (not shown). In other words, this configuration disengages drive-by-wire mode and switches from electronic governor 412 to a mechanical governor (not shown). This mode may be utilized when power is not available to the controller 408 and actuator 410.

In an autonomous mode, power is supplied to the electromagnetic clutch 406 by an autonomous system power supply 418. When the electromagnetic clutch 406 is engaged, the controller 408 receives signals from a robotic control system 420 instead of from the accelerator pedal 404. The controller 408 generates actuator signals based on the input signals as when it receives input signals from the accelerator pedal 404. The actuator signals cause the actuator 410 to control the governor 412 and thereby the fuel flow to the engine 414. In autonomous and manual electronic modes, a vehicle level power supply 422 provides power to the controller 408 and actuator 410.

Accordingly, in one embodiment of the invention, a robotic vehicle control system includes at least one operation system, for example a throttle system 402 (or a steering, braking, or transmission system) that is disconnected from a remote mechanical operation member, an electrically controlled local actuator 410 that controls the operation system, and a restoration mechanism that can be engaged or disengaged. When the restoration mechanism is engaged or disengaged appropriately, a mechanical linkage between the remote mechanical operation member and the operation system controls the operation system according to a setting of the remote operation member and the electrically controlled local actuator 410 is disengaged, and/or the remote operation member and mechanical linkage dominate or override the operation of the electrically controlled local actuator 410. In certain embodiments, when the restoration mechanism is engaged, each operation system is backdriveable.

The throttle system 402 as described herein is therefore an example of a system that is not wholly mechanical, but retains mechanical "reversal" capability. As discussed herein, it is advantageous when all systems can be restored to full mechanical operation by use of electrically disengaged clutches. However, embodiments of the invention also encompass all electrical systems for certain aspects thereof, and as described with respect to the throttle system 403, remains advantageous when one, some, or all mechanical operation systems are decoupled from direct mechanical control members to be electrically controlled, but are also provide with a restoration mechanism such that they may be readily restored to full manual operation.

Steering System

FIGS. 2-4 illustrate a steering system 202 in one embodiment of the present invention. The steering system 202 comprises both manual and autonomous subsystems. The manual subsystem comprises a steering wheel 204. The steering wheel 204 is attached to a steering shaft 206. The steering shaft 206 is connected to a steering rack 207, which is connected to the wheels 208. When a user turns the steering wheel 204, the steering shaft 206 turns causing the rack 207 to move and the wheels 208 to turn.

The steering system 202 also comprises an autonomous subsystem. The autonomous subsystem comprises a power supply 210. The power supply 210 provides power to a controller 212. The controller 212 utilizes a variety of inputs to generate control signals, which it sends to the actuator 214. The actuator 214 is capable of causing the wheels 208 to turn. In one embodiment, the actuator 214 comprises a motor that is capable of producing sufficient torque to turn the steering shaft 206, which, in turn, turns the wheels 208. If the actuator 214 is embodied as a motor, the motor may be attached to the steering shaft 206 via a planetary gear set 230. Other types of actuators 214 such as hydraulic or electromagnetic actuators may also be utilized.

In the embodiment shown in FIGS. 2-4, the actuator 214 is attached to the steering shaft 206 through an electromagnetic clutch 216. In the default setting the power switch 218 is off and the electromagnetic clutch 216 is disengaged. The clutch 216 is only engaged when the power switch 218 is on. Similarly, during any loss of power, the electromagnetic clutch 216 is disengaged.

Since an electromagnetic clutch 216 is utilized, when the clutch 216 is disengaged, there is a minimal effect on the feel of the steering to a user in manual mode. The user only turns the additional weight of the clutch plate 232 when the clutch 216 is disengaged. The user does not have to turn the actuator 214. The steering assembly 202 is configured to allow for correct power level, movement, and response time of the steering.

In the embodiment shown in FIG. 2, the autonomous and manual subsystems may be connected to the wheels 208 via an AND gate 220. Thus, any inputs from the autonomous and manual systems are combined. If the resistance of the actuator 214 and gear/belt connection is high, the operator will have difficulty turning the wheel 204 and affecting the steering. On the other hand, if the resistance is low, the operator may affect the steering even in autonomous mode. When the EM clutch 216 is unpowered, it is disengaged, and the vehicle 102 steers essentially as if the autonomous system was not there. As described herein, the steering assembly 202 can also be provided with an operator intervention detector, and the control system may disengage and/or disengage the EM clutch 216 upon operator intervention by any of the methods and systems for operator interaction described herein.

The autonomous system, by joining the manual system at a point upstream, can bring mechanical advantages. First, the autonomous control actuator 214 uses the mechanical advantage (rack and pinion or otherwise) provided by the manual system. Second, the steering wheel 204 turns as the vehicle 102 autonomously operates or operates with an operator in the passenger compartment.

Alternatively, the EM clutch 216 may be arranged, or an additional normally-engaged-when-unpowered clutch may be provided, to disconnect the steering wheel 204 and/or shaft 206 from the steering system 202 when the vehicle 102 is in autonomous mode. In either case, the steering wheel 204 may be provided with an operator intervention detector (distinct from an E-stop button) that initiates emergency stops or operator takeover.

The embodiment shown in FIGS. 2-4 also includes one or more potentiometers 222. The potentiometers 222 sense the movement of the steering shaft 206. The signal from the potentiometers 222 provides feedback 224 for use by the controller 212 in determining what signals to send to the actuator 214. For instance, the controller 212 may send a particular signal to the actuator 214 to turn the steering shaft 206 a specific number of degrees. However, due to an obstruction under one of the wheels 208, the actuator 214 turns the shaft 206 a smaller number of degrees. Since the controller 212 is receiving feedback 224, the controller 212 can correct for this discrepancy.

Transmission System

Figure 6:
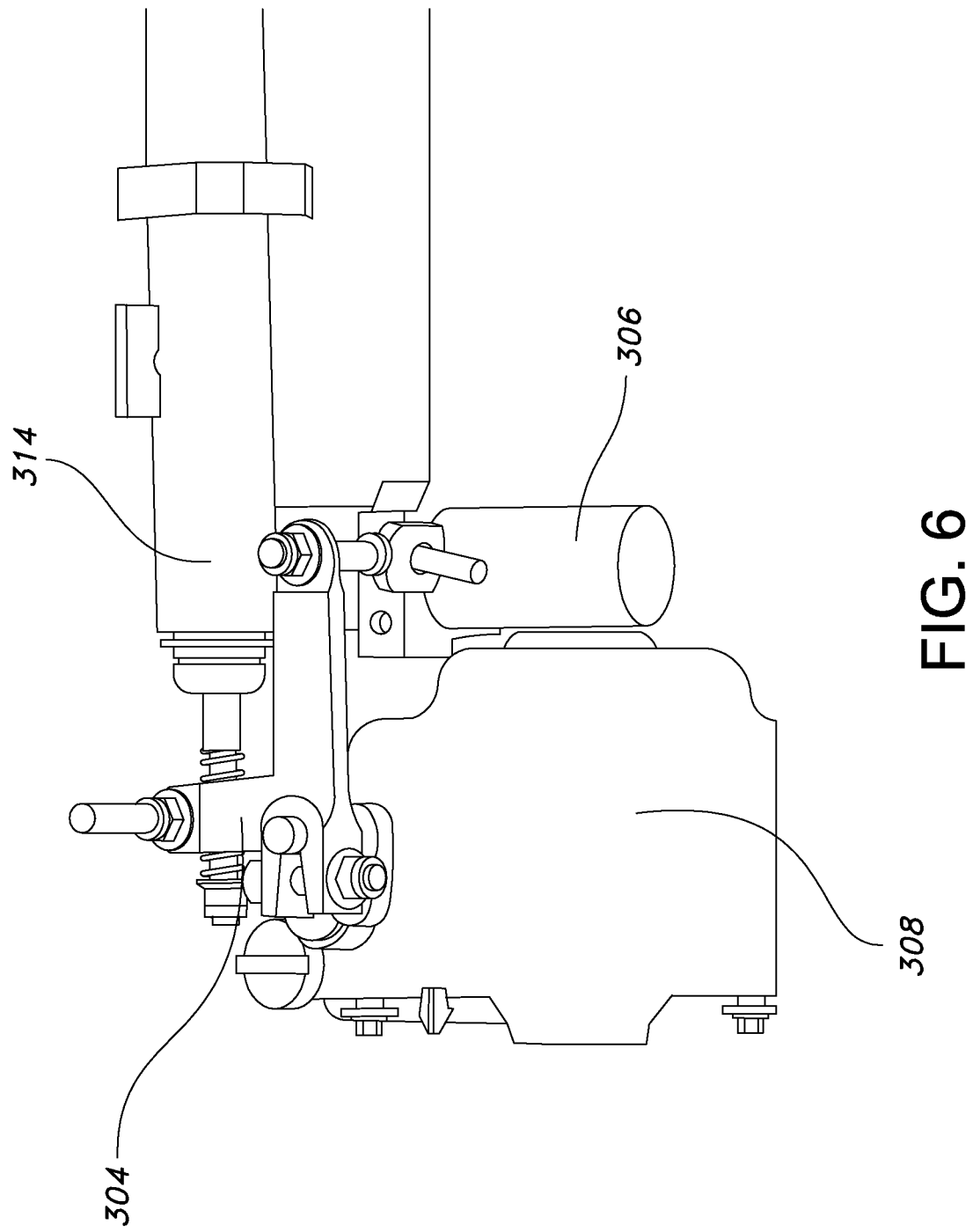
FIG. 6 is a diagram illustrating a transmission system in another embodiment of the invention.

FIGS. 5 and 6 illustrate a transmission system 302 in one embodiment of the present invention, which comprises both manual and autonomous subsystems.

The manual subsystem comprises a gearshift lever 304. The gearshift lever 304 is attached via an electromagnetic clutch 306 to a transmission with an integrated clutch (transmission/clutch) 308. Alternatively, the integrated clutch 308 is an electromagnetic clutch, and no additional electromagnetic clutch is necessary or provided. When power is shut off to the electromagnetic clutch 306, movement of the gearshift lever 304 causes the integrated transmission/clutch 308 to change gears. When power is applied to the electromagnetic clutch 306, the autonomous system is able to control the integrated transmission/clutch 308. When the user moves the gearshift lever 304 and the power is off, different gears are selected in the integrated transmission/clutch 308, such as forward, neutral, and reverse. In other embodiments, the gearshift lever 304 is attached directly to the integrated transmission/clutch 308. The electromagnetic clutch 306 in such an embodiment attaches the autonomous system to the gearshift lever 304.

In the embodiment illustrated in FIG. 6 an additional tab is placed on the gearshift lever 304 or shifting rod so that it can be connected with the shifting actuator 314 for autonomous control. This preserves the manual aspects of the gearshift lever 304, allowing manual operation of the shifter. In one such embodiment, the actuator 314 is a linear actuator. A linear actuator typically costs less than more complex rotary actuators.

The autonomous system shown in FIG. 5 comprises a power supply 310. The power supply 310 supplies power to a controller 312. The controller 312 receives various inputs, such as inputs from a vehicle control unit or robotic control system (not shown), and outputs corresponding actuator signals to an actuator 314.

In certain embodiments the actuator 314 comprises a solenoid. When powered, the solenoid moves the gearshift lever 304 via the electromagnetic clutch 306, causing the transmission/clutch 308 to change gears. Various other types of actuators 314 may also be utilized, such as hydraulic actuators or motors.

In one embodiment of the present invention, the transmission system 302 includes a neutral switch and a reverse switch (not shown). The neutral and reverse switches provide means to calibrate the actuator 314 so that the autonomous systems are able to accurately select gears.

The foregoing description of the embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the this invention.

The invention claimed is:

1. A robotic control system for operating a robotically operable vehicle comprising:
   a plurality of operation systems that is automatically controllable when the vehicle is operated in an autonomous mode, the plurality of operation systems including:
      a steering system for controlling a direction of movement of the vehicle;
      a braking system for controlling braking of the vehicle,
      a throttle system for controlling a speed of the vehicle; and
      a transmission system for selecting a gear for the vehicle;
   an electrically controlled actuator configured for, in accordance with control signals generated by an autonomous control system, operating an operation system of the plurality of operation systems;
   a mechanical linkage configured for controlling an operation system of the plurality of operation systems corresponding to the mechanical linkage according to remote commands received from a remote operation member; and
   a plurality of electrically actuated clutches configured for causing the vehicle to operate in the autonomous mode by powering on and allowing the plurality of operation systems to receive control signals from an autonomous control system, and for allowing the vehicle to operate in a manual mode by powering off, wherein the electrically controlled actuator is mated to at least one of the plurality of operation systems by at least one electrically actuated clutch, and wherein the robotic control system is configured to switch from the autonomous mode to the manual mode upon verifying that a human is controlling the robotically operable vehicle by: (i) receiving, from a sensor, a sensor signal that indicates that the human is in a driver's seat in the robotically operable vehicle, and (ii) detecting, using an algorithm executing on a processor, a pattern of controlling a plurality of controls of the robotically operable vehicle in a manner that is indicative of an exercise of human judgment.

2. The system as in claim 1, wherein the mechanical linkage has incorporated therein at least one of an electromagnetically actuated clutch or a mechanical device including at least one of pull-pin, a lever, a pedal, a push button, or a switch.

3. The system as in claim 1, where the operation system corresponding to the mechanical linkage is backdrivable.

4. The system as in claim 1, further comprising:
   a parking control element with a predetermined setting that is configured for disabling movement of the vehicle in the manual mode;
   a controller configured to generate a signal indicating autonomous mode operation; and
   a disengaging mechanism to receive the signal and to enable movement in the autonomous mode to start the vehicle while leaving the parking control element in a predetermined position.

5. The system as in claim 4, wherein the disengaging mechanism is configured for disabling movement in the autonomous mode and for engaging parking brakes if the parking control element moves out of the predetermined setting or if the controller generates an E-Stop signal.

6. The system as in claim 4, wherein enabling movement in the autonomous mode comprises engaging at least one of the plurality of electromagnetically actuated clutches that is incorporated in the mechanical linkage.

7. The system as in claim 6, further comprising an E-Stop system capable of removing power from the plurality of electrically actuated clutches but not from the actuator.

8. The system as in claim 7, wherein the E-Stop system is configured to be triggered upon receipt of manual inputs by at least one of a brake handle, a brake pedal, a throttle, a steering wheel, a gearshift lever, or an E-Stop switch.

9. The system as in claim 6, wherein the electrically controlled actuator comprises a plurality of electrically controlled actuators, and wherein the vehicle is configured to be operated in the autonomous mode at least in part through the plurality of electrically controlled actuators operating the braking system, the steering system, the throttle system, and the transmission system.

10. The system as in claim 4, the system further comprising:
   a mechanical vehicle control system capable of receiving manual inputs from a mechanical operation member to operate the vehicle in the manual mode;
   the controller capable of generating autonomous control signals during the autonomous mode operation;
   the actuator configured to receive the autonomous control signals and operate the mechanical vehicle control system in the autonomous mode; and
   at least one mechanically charged safety system that is mechanically biased to suppress movement of a movable system of the vehicle, and that is configured to release the mechanical bias and permit movement of the movable system when activated by the robotic control system.

11. The system as in claim 10, further comprising a parking brake lever configured to be in a set position such that the parking brake is engaged,
   wherein the controller is further configured to generate a first mode signal indicating an autonomous mode selection,
   wherein the disengaging mechanism is configured to disengage the parking brake while maintaining the parking brake lever in the set position; and
   wherein the vehicle is configured to be started in the autonomous mode and controlled by the controller capable of generating autonomous control signals.

12. The system as in claim 11, wherein the actuator is further configured to:
   receive a second mode switch signal indicating a manual mode selection;
   disengage the vehicle from the autonomous mode; and
   engage the parking brake.

13. The system as in claim 12, wherein the second mode switch signal comprises at least one of a signal configured for indicating a movement of the parking brake lever or a signal configured for indicating a movement of the mechanical operation member.

14. The system as in claim 12, wherein the second mode switch signal comprises an E-Stop signal configured to cause the vehicle to stop and the engine of the vehicle to stop.

15. The system as in claim 11, wherein the robotic control system is further configured to:
   receive an input signal indicative of the exercise of human judgment; and
   prioritize the input signal above the autonomous control signals.

16. The system as in claim 11, wherein the vehicle is configured to be started in the autonomous mode by engaging the plurality of electrically actuated clutches.

17. The system as in claim 11, wherein the set position has mechanical bias and wherein the actuator is further configured to disengage the parking brake to overcome the mechanical bias so that the parking brake is configured to re-engage the mechanical bias if the actuator loses power.

18. The system as in claim 17, wherein the controller is further configured to remove power from the actuator for re-engaging the parking brake lever that actuates a safety stop.

19. The system as in claim 18, wherein the controller is further configured to reset the safety stop before disengaging the parking brake.

20. The system of claim 10, wherein when electrical power is removed from the robotic control system, the plurality of electrically actuated clutches is configured to deactivate and suppress movement of the movable system.

21. The system as in claim 10, wherein the autonomous mode operation comprises the vehicle being configured to be operated in response to the autonomous control signals generated by the controller.

22. The system as in claim 10, wherein the vehicle is configured to be operated in the manual mode by disengaging the plurality of electrically actuated clutches to allow the mechanical vehicle control system to operate the vehicle in the manual mode and wherein the vehicle is configured to be operated in the autonomous mode by engaging the plurality of electrically actuated clutches to allow the at least one actuator to operate the vehicle in the autonomous mode in response to autonomous control signals.

23. The system as in claim 1, wherein the clutch includes a mechanical coupling for connecting and disconnecting the electrically controlled actuator and one of the plurality of operation systems.

* * * * *